(12) United States Patent  
Rouat et al.

(10) Patent No.: US 8,346,692 B2  
(45) Date of Patent: Jan. 1, 2013

(54) SPATIO-TEMPORAL PATTERN RECOGNITION USING A SPIKING NEURAL NETWORK AND PROCESSING THEREOF ON A PORTABLE AND/OR DISTRIBUTED COMPUTER

(75) Inventors: Jean Rouat, Quebec (CA); Ramin Pichevar, Ottawa (CA); Stephane Loiselle, Chicoutimi (CA); Le Tan Thanh Tai, Ho Chi Minh (VN); Anh Hoang Hai, Hai Duong (VN); Jean Lavoie, Sherbrooke (CA); Jocelyn Bergeron, Sherbrooke (CA)

(73) Assignee: Societe de Commercialisation des Produits de la Recherche Appliquee-Socpra-Sciences et Genie S.E.C., Sherbrooke, Quebec (CA)

( * ) Notice: Subject to any disclaimer, the term of this patent is extended or adjusted under 35 U.S.C. 154(b) by 764 days.

(21) Appl. No.: 12/158,134

(22) PCT Filed: Dec. 22, 2006

(86) PCT No.: PCT/CA2006/002129  
§ 371 (c)(1),  
(2), (4) Date: Nov. 20, 2008

(87) PCT Pub. No.: WO2007/071070  
PCT Pub. Date: Jun. 28, 2007

(65) Prior Publication Data  
US 2009/0287624 A1    Nov. 19, 2009

(51) Int. Cl.  
*G06G 7/00*  (2006.01)

(52) U.S. Cl. ........................................... 706/20

(58) Field of Classification Search ......................... None  
See application file for complete search history.

(56) References Cited

U.S. PATENT DOCUMENTS 4,518,866 A    5/1985    Clymer  
(Continued)

FOREIGN PATENT DOCUMENTS

WO    2004/088457    3/2004  
(Continued)

OTHER PUBLICATIONS

Yamaguchi, Yoko, "A Theory of Hippocampal Memory Based on Theta Phase Precession", May 2003, Biological Cybernetics, 89, p. 1-9.*

(Continued)

*Primary Examiner* — Jeffrey A Gaffin  
*Assistant Examiner* — Paulinho E Smith  
(74) *Attorney, Agent, or Firm* — Fay Kaplun & Marcin, LLP

(57) ABSTRACT

A spiking neural network has a layer of connected neurons exchanging signals. Each neuron is connected to at least one other neuron. A neuron is active if it spikes at least once during a time interval. Time-varying synaptic weights are computed between each neuron and at least one other neuron connected thereto. These weights are computed according to a number of active neurons that are connected to the neuron. The weights are also computed according to an activity of the spiking neural network during the time interval. Spiking of each neuron is synchronized according to a number of active neurons connected to the neuron and according to the weights. A pattern is submitted to the spiking neural network for generating sequences of spikes, which are modulated over time by the spiking synchronization. The pattern is characterized according to the sequences of spikes generated in the spiking neural network.

22 Claims, 26 Drawing Sheets

U.S. PATENT DOCUMENTS

| | | | |
|---|---|---|---|
| 5,216,752 | A | 6/1993 | Tam |
| 5,255,348 | A | 10/1993 | Nenov |
| 5,664,065 | A | 9/1997 | Johnson |
| 6,067,536 | A | 5/2000 | Maruyama et al. |
| 6,144,952 | A | 11/2000 | Keeler et al. |
| 6,242,988 | B1 | 6/2001 | Sarpeshkar |
| 6,581,048 | B1 | 6/2003 | Werbos |
| 6,643,627 | B2 | 11/2003 | Liaw et al. |
| 2003/0228054 | A1 | 12/2003 | Deco |
| 2004/0107172 | A1 | 6/2004 | Wang |

FOREIGN PATENT DOCUMENTS

| | | |
|---|---|---|
| WO | 2004 / 097733 | 11/2004 |
| WO | 2006 / 000103 | 1/2006 |
| WO | WO 2006000103 A1 * | 1/2006 |

OTHER PUBLICATIONS

Abdallah et al., "Unsupervised Analysis of Polyphonic Music by Sparse Coding", IEEE Trans Neural Network, vol. 17, No. 1, Jan. 2006, pp. 179-196.

Agarwal et al.,"Learning to Detect Objects in Images via a Sparse, Part-Based Representation", IEEE Trans. on Pattern Analysis and Machine Intelligence, vol. 26, pp. 1475-1490, 2004.

Aggarwal et al., "On the Suprising Behavior of Distance Metrics in High Dimensional Space", Lecture Notes in Computer Science, vol. 1973/2001, 2001, http://www.springerlink.com/content/dx1mychc32yqhr4g/abstract/?target=save, 15 sheets.

Ainsworth et al., Speech Analysis by Means of a Physiologically-Based Model of the Cochlear Nerve and Cochlear Nucleus in Visual Representations of Speech Signals, John Wiley & Sons, pp. 119-124, 1993.

Andersen et al., "Multimodal Representation of Space in the Posterior Partietal Cortex and its Use in Planning Movements", Ann. Rev. Neurosci., vol. 30, pp. 303-330, 1997.

Ando et al., "A Nonlinear Oscillator Network Circuit for Image Segmentation with Double-Threshold Phase Detection", Artificial Neural Networks, Publ. No. 470, pp. 655-660, Sep. 1999.

Aoinishi et al., "A Phase Locking Theory of Matching Between Rotated Images by Dynamic Link Matching", Biological Cybernetics, vol. 78, pp. 253-264, 1998.

Bello-Correa, "Towards the Automated Analysis of Simple Polyphonic Music: A Knowledge-Based Approach", PhD Thesis, University of London, 241 sheets, Jan. 2003.

Berthommier et al., "Improving of Amplitude Modulation Maps for F0-Dependent Segregation of Harmonic Sounds", Eurospeech '97, 4 sheets, 1997.

Bird et al., "Speech Annotation and Corpus Tools", Speech Communication Journal, vol. 33, 4 sheets, 2001.

Bohte et al., "Unsupervised Clustering with Spiking Neurons by Sparse Temporal Coding and Multilayer RBF Networks", IEEE Transactions on Neural Networks, vol. 13, No. 2, pp. 426-435, Mar. 2002.

Borisyuk et al., "Oscillatory Model of Novelty Detection", Network: Computation in Neural Systems, vol. 12, No. 1, pp. 1-20, 2001.

Borisyuk et al., "Oscillatory Neural Network of Attention Focus Formation and Control", Biosystems, vol. 71, pp. 29-38, 2003.

Brown et al., "Computational Auditory Scene Analysis", Computer Speech and Language, vol. 8, pp. 297-336, 1994.

Burges, "A Tutorial on Support Vector Machines for Pattern Recognition", Data Mining and Knowledge Discovery, vol. 2, pp. 121-167, 1998.

Campbell et al., "Synchrony and Desynchrony in Integrate-and-Fire Oscillators", Neural Comput, pp. 1498-1503, 1999.

Cesmelli et al., "Motion Segmentation Based on Motion/Brightness Inegration and Oscillatory Correlation", IEEE Trans. on Neural Networks, vol. 11, No. 4, pp. 935-947, Jul. 2000.

Chechik et al., "Temporally Dependent Plasticity: An Information Theoretic Account", NPIS, 2000, 7 sheets.

Compernolle et al., "Speech Recognition in Noisy Environments with the Aid of Micorphone Array", Speech Comm., vol. 9, No. 5-6, pp. 433-442, 1990; $2^{nd}$ Revision, 1990.

Cooke, http://www.dcs.shef.ac.uk/~martin/; Martin Cooke's Home Page, 2 sheets, 2011.

Cooke et al., "Robust Automatic Speech Recognition with Missing and Unreliable Acoustic Data", Speech Comm., vol. 34, pp. 267-285, 2001.

Cooke et al., "The Auditory Organization of Speech and Other Sources in Listeners and Computational Models", Speech Communication, vol. 35, pp. 141-177, 2001.

Delgute, "Representation of Speech-Like Sounds in the Discharge Patterns of Auditory-Nerve Fibers", JASA, vol. 68, pp. 843-857, 1980.

Delorme et al., "Spikenet: A Simulator for Modeling Large Networks of Integrate and Fire Neurons", Neurocomputing, vol. 26-27, pp. 989-996, 1999.

Deweese, "Optimization Principles for the Neural Code", Network: Computation in Neural Systems, vol. 7, No. 2, pp. 325-331, 1996.

Deweese et al., "Binary Coding in Auditory Cortex", NIPS, Dec. 2002, 8 sheets.

Deweese et al., "Binary Spiking in Auditory Cortex, The Journal of Neuroscience", vol. 23, No. 21, pp. 7940-7949, Aug. 27, 2003.

Ellis, "Prediction-Driven Computational Auditory Scene Analysis", Ph.D. Thesis, MIT, 1996, 180 sheets.

Ezzaidi et al., "Combining Pitch and MFCC for Speaker Identification Systems", In a Speaker Odyssey, The Speaker Recognition Workshop, An ISCA Tutorial and Research Workshop (ITRW) on Speaker Recognition, 6 sheets, Jun. 18-22, 2001.

Ezzaidi et al., "Pitch and MFCC Dependent GMM Models for Speaker Identification Systems", In IEEE CCECE, 4 sheets, accepted 2004.

Ezzaidi et al., "Speech, Music and Songs Discrimination in the Context of Handsets Variability", In Proceedings of ICSLP 2002, 4 sheets, Sep. 2002.

Frisina et al., "Differential Encoding of Rapid Changes in Sound Amplitude by Second-Order Auditory Neurons", Experimental Brain Research, vol. 60, pp. 417-422, 1985.

Fukushima, "A Neural Network Model for Selective Attention in Visual Pattern Recognition", Biol. Cybernetics, vol. 55, pp. 5-15, 1986.

Gabbiani et al., "Multiplicative Computation in a Visual Neuron Sensitive to Looming" Nature, vol. 420, pp. 320-324, Nov. 2002.

Gaillard et al., "A Modified Zero-Crossing Method for Pitch Detection in Presence of Interfering Sources", Institut de la Communication Parlée, UPRESA 5009, 4 sheets.

Ghitza, "Auditory Models and Human Performance in Tasks Related to Speech Coding and Speech Recognition", IEEE TrSAP vol. 2, No. 1, Part II, pp. 115-132, Jan. 1994.

Giguere et al., "A Computational Model of the Auditory Periphery for Speech and Hearing Research", JASA, vol. 95, No. 1, pp. 331-349, Jan. 1994.

Grossberg et al., "Artstream: A Neural Model of Auditory Scene Analysis and Source Segregation", Neural Networks, vol. 17, 2004, pp. 511-536.

Harding et al., "Multi-Resolution Auditory Scene Analysis: Robust Speech Recognition Using Pattern-Matching from a Noisy Signal", Eurospeech, Sep. 2003, pp. 2109-2112.

Hewitt et al., "A Computer Model of Amplitude-Modulation Sensitivity of Single Units in the Inferior Colliculus, Journal of the Acoustical Society of America,", vol. 95, No. 4, pp. 2145-2159, Apr. 1994.

Ho et al., Novelty Detection Based on Relaxation Time of a Network of Integrate-and-Fire Neurons, Proc. of the IEEE, INNS Int. Joint Conf. on Neural Networks, vol. 2, pp. 1524-1529, May 1998.

Hopfield, "Pattern Recognition Computation Using Action Potential Timing for Stimulus Representation", Nature, vol. 376, pp. 33-36, Jul. 1995.

Hopfield et al., "Rapid Local Synchronization of Action Potentials: Toward Computation with Couple Integrate-and-Fire Neurons", Proc. Natl. Acad. Sci. USA, vol. 92, pp. 6655-6662, Jul. 1995.

Hoyer, "Non-Negative Matrix Factorization with Sparseness Constraints", Journal of Machine Learning Research, vol. 5, pp. 1457-1469, 2004.

Hu et al., "Monaural Speech Segregation Based on Pitch Tracking and Amplitude Modulation", IEEE Trans. on Neural Networks, vol. 15, No. 5, pp. 1135-1150, Sep. 2004.

Hu et al., "Monaural Speech Segregation Based on Pitch Tracking and Amplitude Modulation", Tech. Rep. Ohio State University, 4 sheets, 2002.

Hu et al., "Separation of Stop Consonants", Proceedings of IEEE International Conference on Acoustics, Speech and Signal Processing, ICASSP 2003, pp. 749-752.

Hunt et al., "Speaker Dependant and Independent Speech Recognition Experiements with an Auditory Model", IEEE ICASSP, New York, pp. 215-218, 1988.

Hunt et al., "Speech Recognition Using an Auditory Model with Pitch-Synchronous Analysis", In ICASSP, IEEE, New York, pp. 813-816, 1987.

Huntsberger, "Biologically Inspired Autonomous Rover Control", *Autonomous Robots*, vol. 11, pp. 341-346, Aug. 2001.

Hyup et al. "Devs-c++Reference Guide, Technical Report, Artificial Intelligence and Simulation Research Group", University of Arizona, 66 sheets, Oct. 1997.

Irino et al., "An Analysis/Synthesis Auditory Filterbank Based on an IIR Implementation of the Gammachip", J. Accoust. Soc. Jpn., vol. 20, No. 5, pp. 397-406, Nov. 1999.

Irino et al., "Speech Segregation Using Event Synchronous Auditory Vocoder", ICASSP, vol. V, pp. 525-528, 2003.

ITU-T, "Perceptual Evaluation of Speech Quality (PESQ): An Objective Method for End-to-End Speech Quality Assessment of Narrow-Band Telephone Networks and Speech Codecs", ITU-t Recommendation p. 862, 30 sheets, Feb. 2001.

Jang et al., "A Maximum Likelihood Approach to Single-Channel Source Separation", IEEE-SPL, Journal of Machine Learning Research, vol. 4, pp. 1365-1392, 2003.

Kaneda et al., "Adaptive Microphone-Array System for Noise Reduction", IEEE TrASSP, vol. 34, No. 6, pp. 1931-1400, Dec. 1986.

Kofman et al., "Discrete Event Based Simulation and Control of Continuous Systems", PhD Thesis, Universidad Nacional de Rosario, 175 sheets, 2003.

Konen et al., "A Fast Dynamic Link Matching Algorithm for Invariant Pattern Recognition", Neural Networks, vol. 7, No. 6/7, pp. 1019-1030, 1994.

Kubin et al., "On Speech Coding in a Perceptual Domain", ICASSP, vol. 1, Phoenix, Arizona, pp. 205-208, 1999.

LeCun et al., "Learning Methods for Generic Object Recognition with Invariance to Pose and Lighting", IEEE Computer Vision and Pattern Recognition Conference, Washington, USA, 8 sheets, 2004.

Levy et al., "Distributed Synchrony in a Cell Assembly of Spiking Neurons", Neural Networks, vol. 14, No. 6/7, pp. 815-824, 2001.

Lewicki et al., "Learning Overcomplete Representations", Neural Computation, vol. 12, pp. 337-365, 2000.

Li et al., "Learning Spatially Localized, Parts-Based Representation", In IEEE Computer Vision and Pattern Recognition, vol. 1, pp. 207-212, 2001.

Liberman et al., "The Ipsilaterally Evoked Olivocochlear Reflux Causes Rapid Adaptation of the 2F1-F2 Distortion Product Otoacoustic Emission", JASA, vol. 99, No. 6. pp. 3572-3584, 1996.

Maass et al., "Networks of Spiking Neurons: The Third Generation of Neural Network Models", Neural Networks, vol. 10, No. 9, pp. 1659-1671, 1997.

Maass et al., "Real-Time Computing without Stable States: A new Framework for Neural Computation Based on Perturbation", vol. 14, No. 11, pp. 2531-2560, Nov. 2002.

Maass et al., "Neural Systems as Nonlinear Filters", Neural Computation, vol. 12, No. 8, pp. 1743-1772, Aug. 2000.

Mattia et al., "Efficient Event-Driven Simulation of Large Networks of Spiking Neurons and Dynamical Synapses", Neural Computation, vol. 12, pp. 2305-2329, 2000.

McEachern, "How the Ear Really Works", IEEE Int. Symp. Time Frequency and Time-Scale Analysis, 1992, pp. 437-440.

Mellinger, "Event Formation and Separation in Musical Sound", Ph.D. Thesis, Stanford University, 242 sheets, Dec. 1991.

Milner, "A Model for Visual Shape Recognition", Psychological Review, vol. 81, No. 6, pp. 521-535, 1974.

Nakadi et al., "Auditory Fovea Based Speech Separation and its Application to Dialog System", In: IEEE/RSJ International Conference on Intelligent Robots and Systems, pp. 1314-1319, 2002.

Natschlager et al., "Efficient Temporal Processing with Biologically Realistic Dynamic Synapses", Network: Computation in Neural Systems, vol. 12, No. 1, pp. 75-87, 2001.

Natschlager et al., "Information Dynamics and Emergent Computation in Recurrent Circuits of Spiking Neurons", NIPS, 8 sheets, 2003.

Nix et al., "Computational Auditory Scene Analysis by Using Statistics of High-Dimensional Speech Dynamics and Sound Source Direction", Eurospeech Genevsa, pp. 1441-1444, Sep. 2003.

Olshausen et al., "Emergence of Simple-Cell Receptive Field Properties by Learning a Sparse Code for Natural Images", Nature, vol. 381, pp. 607-609, Jun. 1996.

Olshausen et al., "Sparse Coding with an overcompete Basis Set: A Strategy Employed by V1?", Vision Research, vol. 37, No. 1, pp. 3311-3325, 1997.

Panchev et al., "Spiking-Time-Dependent Synaptic Plasticity: From Single Spikes to Spike Trains", Computational Neuroscience Meeting, Springer-Verlag, pp. 494-506, Jul. 2003.

Paquier et al., "Learning New Representations and Goals for Autonomous Robots", In IEEE Int. Conf. on Robotics and Automation, Taiwan, Sep. 2003, pp. 803-808.

Patterson, The Sound of Sinusoid: Spectral Models, JASA, vol. 96, No. 3, Sep. 1994, pp. 1409-1418.

Patterson, The Sound of Sinusoid: Time Intervals Models, JASA, vol. 96, No. 3, Sep. 1994, pp. 1419-1428.

Patterson et al. "Complex Sounds and Auditory Images", Auditory Physiology and Perception, Pergamon Press, Oxford, 1992, pp. 429-446.

Pena et al., "Auditory Spatial Receptive Fields Created by Multiplication", Science, vol. 292, Apr. 2001, pp. 295-295.

Pichevar, http://www.edu.gel.usherbrooke.ca.picr1601, 2011, 4 sheets.

Pichevar et al., "Binding of Audio Elements in the Sound Source Segregation Problem via a Two-Layer Bioinspired Neural Network", In IEEE CCECE' 2003, Montreal, Canada, pp. 1151-1154.

Pichevar et al., "Cochleotopic/AmTopic (CAM) and Cochleotopic/Spectrotopic (CSM) Map Based Sound Source Separation Using Relaxation Oscillatory Neurons", In: IEEE Networks for Signal Processing Workshop, Toulouse, France, 10 sheets, Sep. 2003.

Pichevar et al., "The Oscillatory Dynamic Link Matcher for Spiking-Neuron-Based Pattern Recognition", Neurocomputing, Elsevier, 24 sheets, 2005.

Plante et al., "Improvement of Speech Spectrogram Accuracy by the Method of Reassignment", IEEE Trans. on Speech and Audio Processing, vol. 6, No. 3, pp. 282-287, May 1998.

Postma et al., "SCAN: A Scalable Neural Model of Attentional Selection", Neural Networks, vol. 10, No. 6, pp. 993-1015, 1997.

Potamitis et al., "Multi-Speaker DOA Tracking Using Interceptive Multiple Models and Probabilistic Data Association", EUROSPEECH Geneva, pp. 517-520, 2003.

Reisenhuber et al., "Are Cortical Models Really Bound by the Binding Problem", Neuron, vol. 24, pp. 87-93, Sep. 1999.

Reutimann et al., "Event-Drive Simulation of Spiking Neurons with Stochastic Dynamics", Nueral Computation, vol. 15, pp. 811-830, 2003.

Reyes-Gomez et al., "Multi-Channel Source Separation by Factorial HMMs", in ICASSP 2003, 4 sheets, 2003.

Rietman et al., "Analog Computation with Rings of Quasiperiodic Oscillators: The Microdynamics of Cognition in Living Machines", Robotics and Autonomous Systems, vol. 45, pp. 249-263, 2003.

Roman et al., "Speech Segration Based on Sound Localization", JASA, vol. 14, No. 4, Pt. 1, Oct. 2003, pp. 2236-2252.

Rouat et al., "Perceptive, Non-Linear Speech Processing and Spiking Neural Networks", Nonlinear Speech Modeling, LNAI 3445, pp. 317-337, 2005.

Rouat et al., "A Pitch Determination and Voiced/Unvoiced Decision Algorithm for Noisy Speech", Speech Communication, vol. 21, pp. 191-207, 1997.

Roweis, "Factorial Models and Refiltering for Speech Separation and Denoising", Eurospeech 2003, Geneva, pp. 1009-1012.

Roweis, "One Microphone Source Seperation", In NIPS, Denver, 2000, 7 sheets.

Sameti et al., "HMM Based Strategies for Enhancement of Speech Signals Embedded in Non-Stationary Noise, IEEE Trans. on Speech and Audio Processing", pp. 445-455, 1998.
Sandhu et al., "A Comparative Study of Mel Cepstra and EIH for Phone Classification under Adverse Conditions", ICASSP, pp. 409-412, 1995.
Schmitt, http://www.ruhr-uni-bochum.de/lmi/mschmitt/.
Sejnowski, "Time for a New Neural Code?", Nature 376, pp. 21-22, 1995.
Seltzer et al., "Speech Recognizer-Based Microphone Array Processing for Robust Hands-Free Speech Recognition", In: ICASSP, vol. 1, pp. 897-900, 2002.
Seneff, "A Joint Synchrony/Mean-Rate Model of Auditory Speech Processing", Journal of Phonetics 16, pp. 55-76, 1988.
Simoncelli et al., "Shiftable Multi-Scale Transforms", IEEE Trans. Information Theory, pp. 587-607, 1992.
Slaney et al., "A Perceptual Pitch Detector", ICASSP, pp. 357-360, 1990.
Smith et al., "Efficient Coding of Time-Relative Structure Using Spikes", Neural Computation, pp. 19-45, 2003.
Tang et al., "Modeling Neurons in the Anteroventral Cochlear Nucleus for Amplitude Modulation (AM) Processing: Application to Speech Sound", Proc. Int. Conf. on Spoken Language, 4 sheets, Oct. 1996.
Thorpe et al., "Speed of Processing in the Human Visual System", Nature 381, pp. 520-522, 1996.
Todd, "An Auditory Cortical Theory of Auditory Stream Segregation", Network: Computation in Neural Systems 7, pp. 349-356, 1999.
Valin et al., "Microphone Array Post-Filter for Separation of Simultaneous Non-Stationary Sources", In IEEE Int. Conf. on Acoustics Speech Signal Processing, 4 sheets, 2004.
Valin et al., "Robust Sound Source Localization Using a Microphone Array on a Mobile Robot", IEEE/RSJ—Int. Conf. on Intelligent Robots & Systems, 6 sheets, Oct. 2003.
Van Der Kouwe et al., "A Comparison of Auditory and Blind Separation Techniques for Speech Segregation", IEEE Trans. on Speech and Audio Processing, vol. 9, No. 3, pp. 189-195, Mar. 2001.
Von Der Malsburg, "The Correlation Theory of Brain Function", Tech. Rep. Internal Report 81-2, Max-Planck Institute for Biophysical Chemistry, 1981, pp. 1-26.
Von Der Malsburg, "The What and Why of Binding: The Modeler's Perspective", Neuron, vol. 24, Sep. 1999, pp. 95-104.
Von Der Malsburg et al., "A Neural Cocktail-Party Processor", Bio Cybern, vol. 54, pp. 29-40, 1986.
Wang, "The Time Dimesion for Scene Analysis", IEEE Trans. on Neural Networks, vol. 15, No. 6, pp. 1401-1426, Nov. 2005.
Wang et al., "Locally Excitatory Globally Inhibitory Oscillator Networks: Theory and Application to Pattern Segmentation, Neural Network for Signal Processing 1994 IV", Proceedings fo the 1994 IEEE Workshop Ermioni, Greece Sep. 6-8, 1994, New York, NY, USA, IEEE, pp. 136-145, Sep. 1994.
Wang et al., "Image Segmentation Based on Oscillatory Correlation", Neural Computation, vol. 9, pp. 805-836, 1997.
Wang et al., "Separation of Speech from Interfering Sounds on Oscillatory Correlation", IEEE Transactions on Neural Networks, vol. 10, No. 3, pp. 684-697, May 1999.
Widrow et al., "Adaptive Noise Canceling: Principles and Applications", Proceedings of the IEEE, vol. 63, No. 12, Dec. 1975, pp. 1692-1717.
Willmore et al., "Characterizing the Sparseness of Neural Codes", Network: Computation in Neural Systems, pp. 255-270, 2001.
Wiskott et al., "Slow Feature Analysis: Unsupervised Learning of Invariances", Neural Computation, vol. 14, pp. 715-770, 2002.
Wiskott et al., "Face Recognition by Elastic Bunch Graph Matching", CRC Press, ISBN 0-8493-2055-0, Chapter 11, pp. 355-396, 1999.
Zeigler, "Discrete Event Abstraction: An Emerging Paradigm for Modeling Complex Adaptive Systems", Adaptation and Evoulution, Oxford Press, 20 sheets, 2003.
Zhang et al., "Audio Context Analysis for Online Audiovisual Data Segmentation and Classification", IEEE TrSAP, vol. 9, No. 4, pp. 441-457, May 2001.

Zhang et al., "Detecting Corresponding Segments Across Images Using Synchronzable Pulse-Coupled Neural Networks", IN IJCNN, pp. 820-825, 2001.
Zotkin et al., "Pitch and Timbre Manipulations Using Cortial Representation of Sound", ICASSP, vol. V, pp. 517-520, 2003.
Pichevar et al., "A bio-inspired sound source separation technique in combination with an enhanced FIR gamma-tone Analysis/Synthesis filterbank", In: EUSIPCO Vienna, Submitted, 4 sheets.
Pichevar et al., "Monophonic Source Separation with an Unsupervised Network of Spiking Neurones", Speech Communicarion (Elsiver, submitted), 27 sheets.
Pichevar et al., "Oscilliatory Dynamic Link Matcher: A Bio-Inspired Neural Network for Pattern Recognition", accepted for presentation at BICS'2004, Stirling, UK, 7 sheets.
Pichevar et al., "Double-vowel Segregation Through Temporal Correlation: A bio-inspired Neural Network Paradigm", May 20, 2003, Nonlinear Signal Processing Workshop, Le Croisic, France, 4 sheets.
Rouat et al.,"Nonlinear Speech Processing with Oscillatory Neural Networks for Speaker Segregation", in *proceedings of EUSIPCO 2002*, Sep. 2002, 4 sheets.
Jahnke et al., "Simulation of Spiking Neural Networks on Different Hardware Platforms", Institut fur Mikroelectronic, Technische Universitat Berlin, 6 sheets.
Abeles, "Corticonics, Neural Circuits of the Cerebral Cortex", Cambridge University Press, 1991, pp. 243-255.
Amari, "Dynamics of Patternt Formation in Lateral-Inhibition Type Neural Fields", Bio. Cybernetics, No. 27, 1977, pp. 77-87.
Atlas et al., "Joint Acoustic and Modular Frequency", EURASIP, J. on Appl. Sig. Proc., No. 7, 2003, pp. 668-675.
Aurora, Speech database, www.elda.fr, printed Dec. 2011, 1 sheet.
Bregman, "Auditory Scene Analysis", IEEE 7$^{th}$ International Conference on Pattern Recognition, Canada, 1984, pp. 168-175.
Bergman, "Auditory Scene Analysis", MIT Press, 1990, pp. 260-284.
Cazalas et al., "Auditory Physiology and Perception", 9$^{th}$ Int'l. Symposium on Hearing, France, Jun. 1991, Pergamon Press, pp. 429-445.
Claverol et al., "Scalable Cortical Simulations on Beowulf Architectures", Neurocomputing, 2002, pp. 307-315.
Cooke, "Modelling Auditory Processing and Organization", Cambridge University Press, 1991, 14 sheets.
Eliasmith et al., "Neural Engineering, Computation, Representation, and Dynamics in Neurobiological Systems", MIT Press, 2002, 10 sheets.
Ephraim et al., "Speech Enhancement Using a Minimum Mean-Square Error Short-Time Spectral Amplitude Estimator", IEEE Trans. on Acoustics, Speech, and Signal Processing, vol. ASSP-32, No. 6, Dec. 1984, pp. 1109-1121.
Feldbauer et al., "Critically Sampled Frequency-Warped Perfect Reconstruction Filterbank", Signal Processing and Speech Communication Laboratory, 2003, 4 sheets.
Filippi et al., "JDEVS: An Implementation of a DEVS Based Formal Framework for Environmental Modeling", University of Corsica, Aug. 2003, pp. 1-29.
Furui et al., "Advances in Speech Signal Processing", Marcel Dekker Inc., 1991, 8 sheets.
Gaillard et al., "A Modified Zero-Crossing Method for Pitch Detection in Presence of Interfering Sources", Institute de la Communication Parlee, EUROSPEECH, Greece, 1997, 4 sheets.
Glasberg et al., "Derivation of Auditory Filter Shapes from Notched-Noise Data", Hearing Research, vol. 47, 1990, pp. 103-138.
Gordon, "Theories of Visual Perception", John Wiley and Sons, 1997, 6 sheets.
Haines, "Fundamental Neuroscience", Churchill Livingstone, 1997, 3 sheets.
Haug et al., "Applied Optimal Design", John Wiley and Sons, 1979, 6 sheets.
Ho et al., "A Novelty Detector Using a Network of Integrate-and-Fire Neurons", ICANN, 1997, 6 sheets.
Hyvarinen et al., "Independent Component Analysis", John Wiley and Sons, 2001, 10 sheets.
Immerseel et al., "Pitch and Voiced/Unvoiced Determination with an Auditory Model", J. Acoust. Soc. Am., vol. 91, No. 6, Jun. 1992, pp. 3511-3526.

Irino et al., "A Time-Varying, Analysis/Synthesis Auditory Filterbank Using the Gammachirp", Proceedings of the International Conference on Acoustics, Speech, and Signal Processing, 1998, pp. 3653-3656.

Jutten et al., "Blind Separation of Sources, Part 1: An adaptive Algorithm Based on Neuromimetic Architecture", Signal Processing, Nov. 1991, 11 sheets.

Kaiser, "On a Simple Algorithm to Calculate the 'energy' of a Signal", Bell Communication Research, IEEE, 1990, pp. 381-384.

Karlsen et al., Analysis of a Simultaneous-Speaker Sound Corpus, Lawrence Erlbaum Associates, 1998, pp. 321-333.

Kim et al., "Effective Representation Using ICA for Face Recognition Robust to Local Distortion and Partial Occlusion", IEEE Transactions on Pattern Analysis and Machine Intelligence, vol. 27, No. 12, Dec. 2005, pp. 1977-1981.

Kim et al., "Effects of Age on Contralaterial Suppression of Distortion Product Otoacoustic Emissions in Human Listeners with Normal Hearing", Audiology Neuro-Otology, vol. 7, 2002, pp. 348-357.

Kofman et al., "Quantized-State Systems. A DEVS Approach for Continuos System Simulation", Trans. of SCS, 2001, pp. 1-17.

Lee at al., "Learning the Parts of Objects by Nonnegative Matrix Factorization", Nature, vol. 401, Oct. 1999, pp. 788-791.

Li et al., "Handbook of Face Recognition", Springer, 2005, 11 sheets.

Maass et al., "Pulsed Neural Networks", The MIT Press, 1998, 11 sheets.

McEachern, "How the Ear Really Works", IEEE, 1992, pp. 437-440.

McEachern, "Ratio Detection Precisely Characterizing Signals' Amplitude and Frequency", Mar. 1994, 4 sheets.

Meyer et al., "Applying a Model of Concurrent Vowel Segregation to real Speech", Computational Models of Auditory Function, IOS Press, 2001, pp. 297-310.

Moghaddam et al., "Probabilistic Visual Learning for Object Detection", IEEE Trans. on Pattern Analysis and Machine Intelligence, 1995, pp. 786-793.

Perrinet et al., "Coding Static Natural Images Using Spiking Event Times: Do Neurons Cooperate?", IEEE Trans. on Nueral Networks, vol. 15, No. 5, Sep. 2004, pp. 1164-1175.

Phillips et al., "The FERET Evaluation Methodology for Face-Recognition Algorithms", IEEE Trans. on Pattern Analysis and Machine Intelligence, vol. 22, No. 10, Oct. 2000, pp. 1090-1104.

Pichevar, "Neural and Anthropomorphic Processing of the "Cocktail Party" Effects and its Applications in Information Technology," PhD Thesis, University of Sherbrooke, 2004, 226 sheets.

Pichevar et al, "A Quantative Evaluation of a Bio-Inspired Sound Source Segregation Technique Based for Two and Three Source Mixtures", University of Sherbrooke, 5 sheets, 2005, vol. 3443/2005.

Pichevar et al, "Cochleotopic/Amtopic (CAM) and Cochleotopic/Spectrotopic (CSM) Map Based Sound Source Separation Using Relaxation Oscillatory Neurons", IEEE NNSP Workshop, Toulouse, France, Sep. 2003, 10 sheets.

Pichevar et al., "Oscillatory Dynamic Link Matching for Pattern Recognition", NCWS 2003, Aulla, Italy, 2003, 4 sheets.

Pichevar et al., Oscillatory Dynamic Link Matcher: A Bio-Inspired Neural Network for Pattern Recognition, BICS, 2004, 7 sheets.

Pichevar et al., "Traitment de Processus Spatio-Tempores via un Reseau de Neurones a Decharges", ACFAS, 2001, 1 sheet. (English translation is NOT provided).

Pichevar et al., "Double-Vowel Segregation Through Temporal Correlation: A Bio-Inspired Neural Network Paradigm", NOLISP '03, Le Croisic, 2003, 4 sheets.

Pichevar et al., "A Bio-Inspired Sound Source Separation Technique in Combination with an Enhanced FIR Gammatone Analysis/Synthesis Filterbank", EUSIPCO, 2004, pp. 2063-2066.

Popper et al., "The Mammalian Auditory Pathway: Neurophysiology", Springer-Verlag, 1992, 5 sheets.

Rieke et al., "SPIKES: Exploring the Neural Code", MIT Press, 1997, 5 sheets.

Rochel et al., "An Event-Driven Framework for the Simulation of Networks of Spiking Neurons", ESANN '03 Proceedinga, Belgium, Apr. 2003, pp. 295-300.

Rosenthal et al., "Computational Auditory Scene Analysis", Lawrence Erlbaum Associates, Publishers, 1998, 6 sheets.

Ross et al., "Average Magnitude Difference Function Pitch Extractor", IEEE Trans. on Acoustics, Speech, and Signal Processing, vol. ASSP-22, No. 5, Oct. 1974, pp. 353-362.

Rouat, "Spatio-Temporal Pattern Recognition with Neural Networks: Application to Speech", ICANN '97, Lect. Notes in Comp. Sc. 1327, 1997, pp. 43-48.

Rouat et al., "A Prototype Speech Recognizer Based on Associative Learning and Nonlinear Speech Analysis", Psychological Data and Computational ASA, 1998, pp. 13-26.

Rouat et al., "Perceptive, Non-Linear Speech Processing and Spiking Neural Networks", Springer-Verlag, 2005, pp. 317-337.

Rouat et al., "Nonlinear Speech Processing with Oscillatory Neural Networks for Speaker Segregation", EUSIPCO, Toulouse, France, 2002, 4 sheets.

Rouat et al., "Source Separation with One Ear: Proposition for an Anthropomorphic Approach", EURASIP Journal on Applied Signal Processing, vol. 9, 2005, pp. 1365-1373.

Berthommier et al., "Auditory Processing in a Post-Cochlear Neural Network: Vowel Spectrum Processing Based on Spike Synchrony", Eurospeech '89, Paris, France, Sep. 1989, 4 sheets.

Shareef et al., "Segmetation of Medical Images Using LEGION", IEEE Trans. on Medical Imaging, vol. 18, No. 1, Jan. 1999, pp. 74-91.

Slaney, "Auditory Toolbox", Technical Report # 1998-010, 1998, 52 sheets.

Slaney et al., On the Importance of Time—a Temporal Representation of Sound, Visual Representation of Speech Signals, John Wilety & Sons, Ltd., 1993, 12 sheets.

Sung et al., "Example-Based Learning for View-Based Human Face Detection", IEEE Trans. on Pattern Analysis and Machine Intelligence, vol. 21, No. 1, Jan. 1998, pp. 39-51.

Taylor, "Neural 'Bubble' Dynamics in two Dimensions: Foundations", Biological Cybernetics, vol. 80, 1999, pp. 393-409.

Berthommier et al., "A Front-End Using the Harmonicity Cue for Speech Enhancement in Loud Noise", ICSLP 2000, Beijing, China, Oct. 2000, 4 sheets.

Vitay et al., "Using Neural Dynamics to Switch Attention", International Joint Conf. on Neural Networks, Montreal, Canada, pp. 2891-2896, 2005.

Walker et al., "SimSPiNN—A Simulation for Spike-Processing Neural Networks", 3 sheets, Sep. 2002.

Watts, "Event-Driven Simulation of Networks of Spiking Neurons", pp. 927-934, 1994.

Wermter et al., "Emergent Neural Computational Architectures Based on Neuroscience", Springer, 2004, 6 sheets.

Wiskott et al., "Face Recognition by Dynamic Link Matching", Chapter 18, MIT Press, 2002, pp. 343-372.

Zeigler, "Object-Oriented Simulation with Hierarchical, Modular Models", Academic Press, 1990, pp. 3-156.

Zeigler et al., "Theory of Modeling and Simulation", Second Ed., Academic Press, 2000, 10 sheets.

Zhao et al., "Discriminant Analysis of Principal Components for Face Recognition", Third International Conf. Face and Gesture, 6 sheets, 1998.

Fiesler et al., "Handbook of Neural Computation", IOP Publishing and Ltd and Oxford University Press, 1997, 14 sheets.

Yu et al. "Visual Grouping by Neural Oscillator Networks", IEEE Trans. on Neural Networks, vol. 20, No. 12, Dec. 2009, pp. 1871-1884.

Hoshino et al., "An Image Recognition Based on Neural Oscillator Network", IEEE Int'l Joint Conf. on Neural Netwroks, vol. 18, No. 23, 2010, 6 sheets.

Wechsler, "Reliable Face Recognition Methods. System Design, Implementation and Evaluation", Springer, 2010, 6 sheets.

* cited by examiner

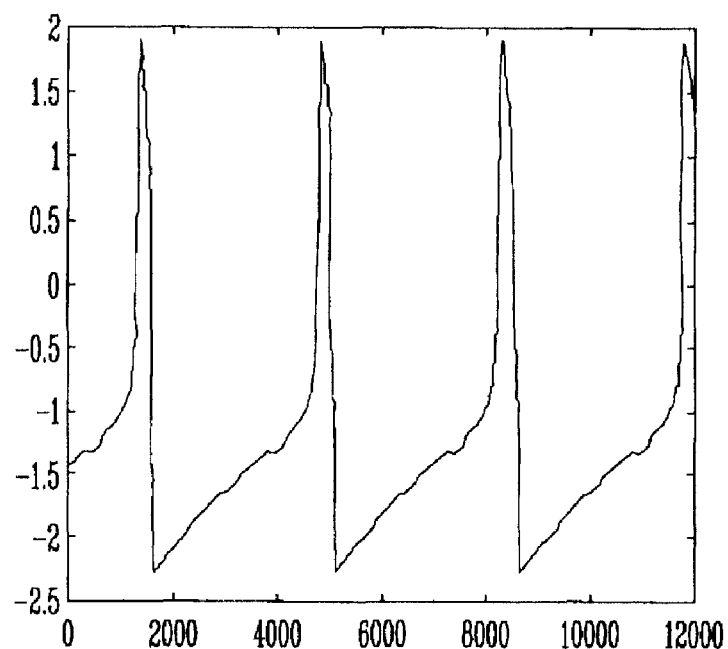
FIG_1A (PRIOR ART)
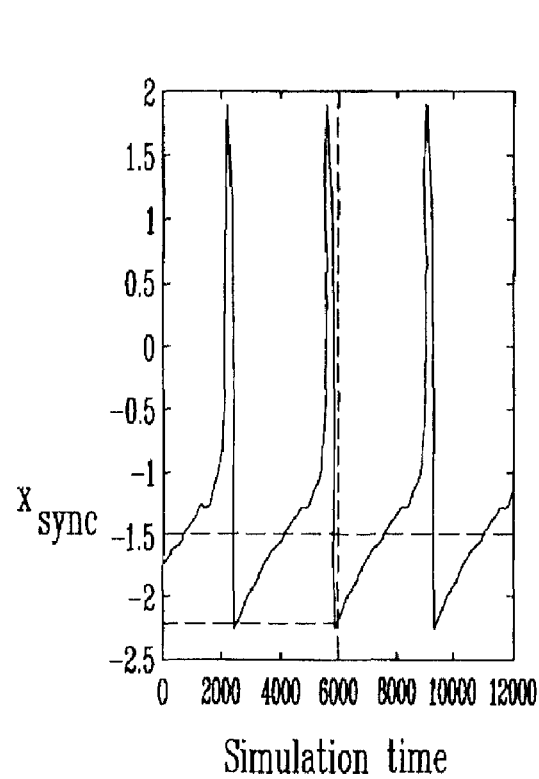
FIG_1B (PRIOR ART)
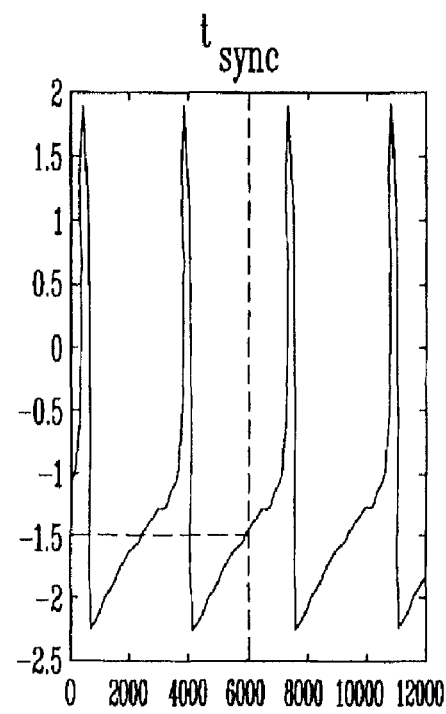
FIG_1C (PRIOR ART)

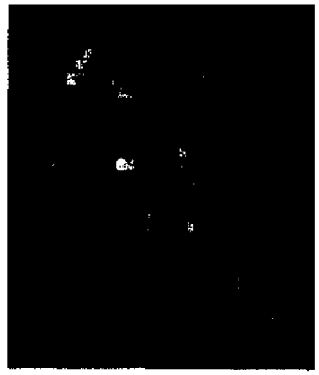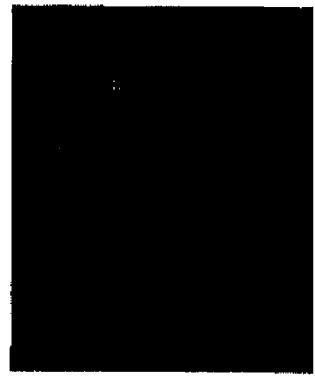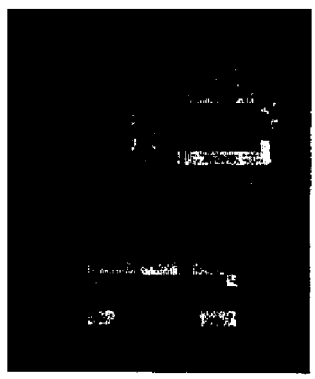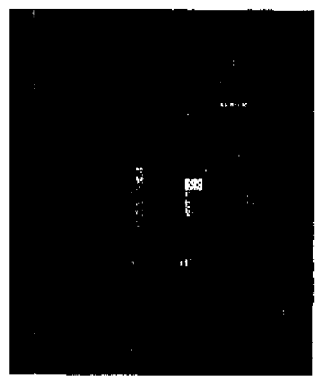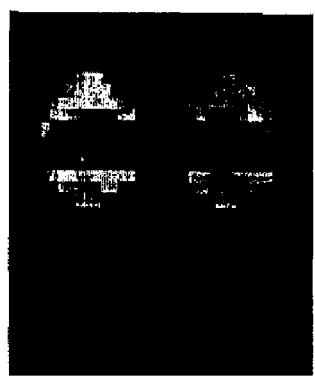
Figure 13

TABLE 1
| Pair of images | Correlation coeff. after matching | Segmentation result | Matching result |
|---|---|---|---|
| Var13-13b | 0.596349 |  |  |
| Var13b-13b | 0.935904 |  |  |
FIGURE 27

SPATIO-TEMPORAL PATTERN RECOGNITION USING A SPIKING NEURAL NETWORK AND PROCESSING THEREOF ON A PORTABLE AND/OR DISTRIBUTED COMPUTER

FIELD OF THE INVENTION

The present invention generally relates to signal processing using a spiking neural network. More specifically, but not exclusively, the present invention is concerned with a system and method for converting an input signal into a sequence of spikes in the spiking neural network. The system and method can be used advantageously, for example, for pattern recognition.

BACKGROUND OF THE INVENTION

Pattern recognition is an aspect of the field of artificial intelligence aiming at providing perceptions to "intelligent" systems, such as robots, programmable controllers, speech recognition systems, artificial vision systems, etc.

In pattern recognition, objects are classified according to some chosen criteria so as to allow these objects to be compared with each other, for example by computing a distance between the objects as a function of the chosen criteria. Accordingly, it is possible, for example, to quantify the similarity or dissimilarity between two objects, to remember an object and to recognize this object later on.

An object, as referred to hereinabove, is not restricted to a physical shape or a visual representation; it has to be understood that an object means any entity that can be represented by a signal.

In general, but not restrictively, the term "distance" can be construed as a mathematical function for measuring a degree of dissimilarity between two objects. For example, if the two objects are assimilated to two respective vectors, this distance can be the Euclidian norm of the difference between the two vectors. The distance could also be, for example, a probability, an error, a score, etc.

Those of ordinary skill in the art of rule-based expert systems, statistical Markovian systems or second generation (formal) neural network systems are familiar with such a concept of "distance".

Unfortunately, the evaluation of this "distance" is often an important burden. Furthermore, object comparison is usually obtained by first comparing segments of the objects, which involves distance comparison. It has been found desirable to achieve such comparison with a more global approach. For example, comparing N signals would require:
- to compute the distance for each combination of two signals among the N signals; and
- to find signals that are similar by sorting and comparing the distances obtained therefrom.

Third generation neural networks, including spiking neural networks and pulsed neural networks, allow to alleviate this distance burden. Indeed, a properly designed spiking neural network allows pattern comparisons and similarity evaluation between different patterns without explicit score or distance computation. This is made by using spiking events that are temporally-organized, as shown in FIG. 1A.

Various schemes are possible for coding temporally-organized spiking neural networks. Two possible schemes are listed below.
  i) Synchronization coding: as illustrated in FIGS. 1B and 1C, neurons not discharging at the same time are not synchronized. Conversely, neural synchronization occurs when similar input stimuli are given to the neurons, which discharge synchronously. This is called neurons synchronization.
  ii) Rank Order Coding: a neuron spikes only when a specific input sequence of spikes is received on its dendrites.

This transfer between conventional digital coding and spike sequences coding is efficient in terms of both distance criteria creation and comparison.

To summarize, a distance between two objects can be represented, for example, by:
  i) more or less similar spike timing between neurons; or
  ii) the process called "Rank Order Coding" characterized by the existence of pairs of excitatory neurons and inhibitory neurons and providing recognition of incoming sequences of spikes from other neurons when a spike is generated by a particular neuron.

Synchronization coding occurs when two groups of neurons appear spontaneously because of plasticity of interconnections of neurons. Thus, two neurons having similar inputs present a growth of their mutual synaptic connections, causing their outputs to be synchronous. Otherwise, when inputs of neurons are not similar, their mutual synaptic connections decrease, causing them to be desynchronized. In fact, the inputs of two neurons spiking simultaneously are relatively correlated.

Source Separation

Separation of mixed signals is an important problem with many applications in the context of audio processing. It can be used, for example, to assist a robot in segregating multiple speakers, to ease an automatic transcription of video via audio tracks, to separate musical instruments before automatic transcription, to clean a signal before performing speech recognition, etc. The ideal instrumental setup is based on the use of an array of microphones during recording to obtain many audio channels. In fact, in that situation, very good separation can be obtained between noise and signal of interest [1] [2] [3] and experiments with great improvements have been reported in speech recognition [4] [5]. Further applications have been ported on mobile robots [6] [7] [7] and have also been developed to track multi-speakers [51].

A source separation process implies segregation and/or fusion (integration), usually based on methods such as correlation, statistical estimation and binding applied on features extracted by an analysis module.

Conventional approaches require training, explicit estimation, supervision, entropy estimation, huge signals databases [7], AURORA database [10] [34], etc. Therefore, design and training of such systems are tedious, time consuming and, therefore, costly.

Moreover, in many situations, only one channel is available to an audio engineer who, nevertheless, has to solve the separation problem. In this case, automatic separation and segregation of the sources is particularly difficult.

Although some known monophonic systems perform reasonably well on specific signals (generally voiced speech), they fail to efficiently segregate a broad range of signals. These disappointing results could potentially be overcome by combining and exchanging expertise and knowledge between engineering, psychoacoustic, physiology and computer science.

Monophonic source separation systems can be seen as performing two main operations: analyzing a signal for yielding a representation suitable for the second operation which is clustering with segregation.

With at least two interfering speakers each generating voiced speech, it is observed that when there is a difference in their respective pitch, separation is relatively easy since spectral representations or auditory images exhibit different regions with structures dominated by a respective pitch. Then, amplitude modulation of cochlear filter outputs (or modulation spectrograms) is discriminative.

In situations where speakers have similar pitches, separation is more difficult to perform. Features, such as phase, have to be preserved when they undergo an analysis. Glottal opening time should be taken into account otherwise long term information such as intonation would be required. However, in the latter case, real-time treatment becomes problematic.

Using Bregman's terminology, bottom-up processing corresponds to primitive processing, and top-down processing means schema-based processing [10]. Auditory cues proposed by Bregman [10] for simple tones are not applicable directly to complex sounds. More sophisticated cues based on different auditory maps are thus desirable. For example, Ellis [11] uses sinusoidal tracks created by an interpolation of spectral picks of the output of a cochlear filter bank, while Mellinger's model [50] uses partials. A partial is formed if an activity on the onset maps (the beginning of an energy burst) coincides with an energy local minimum of the spectral maps. Using these assumptions, Mellinger proposed a CASA (Competitional Auditory Scene Analysis) system in order to separate musical instruments. Cooke [12] introduced harmony strands, which is a counterpart of Mellinger's cues in speech. The integration and segregation of streams is done using Gestalt and Bregman's heuristics. Berthommier and Meyer use Amplitude Modulation maps [4] [13] [14]. Gaillard [16] uses a more conventional approach by using the first zero crossing for the detection of pitch and harmonic structures in the frequency-time map. Brown proposes an algorithm [17] based on the mutual exclusivity Gestalt principle. Hu and Wang use a pitch tracking technique [18]. Wang and Brown [19] use correlograms in combination with bio-inspired neural networks. Grossberg [20] proposes a neural architecture that implements Bregman's rules for simple sounds. Sameti [9] uses HMMs (Hidden Markov Models), while Roweis [21] and Reyes-Gomez [22] use Factorial HMMs. Jang and Lee [22] use a technique based on Maximum a posteriori (MAP) criterion. Another probability-based CASA system is proposed by Cooke [23]. Irino and Patterson [24] propose an auditory representation that is synchronous to glottis and preserves fine temporal information, which makes possible the synchronous segregation of speech. Harding and Meyer [23] use a model of multi-resolution with parallel high-resolution and low-resolution representations of the auditory signal. They propose an implementation for speech recognition. Nix [25] performs a binaural statistical estimation of two speech sources by an approach that integrates temporal and frequency-specific features of speech. This approach tracks magnitude spectra and direction on a frame-by-frame basis.

A major drawback of the above-mentioned systems is that they require training and supervision.

An alternative to supervised systems are autonomous bio-inspired and spiking neural networks.

Dynamic, non linear space and time filtering of spikes in neural networks combined with neurotransmitters diffusion along with the topographic organization of neurones yields simultaneous signal processing and recognition. Moreover, spiking allows the encoding of information into a second time scale that is different from usual time. This second time scale encodes the relative timing of spiking neurones. Synchronization or generation of specific spiking temporal sequences becomes an auto-organization criteria (Abeles [A1]). This is a feature that allows unsupervised training and has a strong impact on the pattern recognition aptitudes of spiking neural networks (Wang [A2]). Furthermore, neural networks with dynamic synapses and varying delays offer a greater computing capacity than those where only weights are changed (Schmitt [A3] and Maass [A4]). Autonomous bio-inspired and spiking neural networks therefore constitute an alternative to supervised systems (NN handbook [A5], Maass [A6]).

A well known amazing characteristic of human perception is that recognition of stimuli is quasi-instantaneous, even if the information propagation speed in living neurons is slow [18] [26] [27]. This implies that neural responses are conditioned by previous events and states of a neural sub-network [7]. Understanding of the underlying mechanisms of perception in combination with that of the peripheral auditory system [28] [17] [29] [30] allows designing of an analysis module.

In a context of a mathematical formalism of spiking neurons, it has been shown that networks of spiking neurons are computationally more powerful than models based on McCulloch Pitts neurons [9]. Information about the result of a computation is already present in a current neural network state long before the complete spatiotemporal input patterns have been received by the neural network [7]. This suggests that neural networks use a temporal order of first spikes for yielding ultra-rapid computation [31]. Thus, neural networks and dynamic synapses (including facilitation and depression) are equivalent to a given quadratic filter that can be approximated by a small neural system [32] [33]. It has been shown that any filter that can be characterized by Volterra series can be approximated with a single layer of neurons. Also, spike coding in neurons is close to optimal, and plasticity in Hebbian learning rule increases mutual information close to optimal [34] [35] [36].

For unsupervised systems, novelty detection allows facilitating autonomy. For example, it can allow robots to detect whether a stimulus is new or has already been encountered. When associated with conditioning, novelty detection can create autonomy of the system [10] [37].

Sequence classification is particularly interesting for speech. Panchev and Wermter [46] have shown that synaptic plasticity can be used to perform recognition of sequences. Perrinet [?] and Thorpe [?] discuss the importance of sparse coding and rank order coding for classification of sequences.

Assemblies, or groups of spiking neurons can be used to implement segregation and fusion, i.e. integration of objects in an auditory image, in other words signal representation. Usually, in signal processing, correlations or distances between signals are implemented with delay lines, products and summations. Similarly, comparison between signals can be made with spiking neurons without implementation of delay lines. This is achieved by presenting images, i.e. signals, to spiking neurons with dynamic synapses. Then, a spontaneous organization appears in the network with sets of neurons firing in synchrony. Neurons with the same firing phase belong to the same auditory objects. Milner [38] and Malsburg [39] [40] propose a temporal correlation to perform binding. Milner and Malsburg have observed that synchrony is a crucial feature to bind neurons associated to similar characteristics. Objects belonging to the same entity are bound together in time. In other words, synchronization between different neurons and desynchronization among different regions perform the binding. To a certain extent, such property has been exploited to perform unsupervised clustering for recognition on images [41], for vowel processing with spike synchrony between cochlear channels [42], to propose pattern recognition with spiking neurons [43], and to perform cell assembly of spiking neurons using Hebbian learning with depression [44]. Furthermore, Wang and Terman [45] have proposed an efficient and robust technique for image segmentation and study the potential in CASA [19].

Pattern Recognition

Pattern recognition robust to noise, symmetry, homothety (size change with angle preservation), etc. has long been a challenging problem in artificial intelligence. Many solutions or partial solutions to this problem have been proposed using expert systems or neural networks. In general, three different approaches are used to perform invariant pattern recognition.

Normalization

In this approach the analyzed object is normalized to a standard position and size by an internal transformation. Advantages of this approach include i) coordinate information (the "where" information) is retrievable at any stage of the processing and ii) there is a minimum loss of information. The disadvantage of this approach is that a network must find an object in a scene and then normalize it. This task is not as obvious as it can appear [46], [47].

Invariant Features

In this approach, some features that are invariant to the location and size of an object are extracted. A disadvantage of this approach are that the position of the object may be difficult to access because of a possibility of loosing information, such as recognition, during the extraction process. The advantage is that this approach does not require knowledge of the position of the object and, unlike normalization that must be followed by an operation of pattern recognition, the invariant features approach already does some pattern recognition by finding important features [48].

Invariance Learning from Temporal Input Sequences

The assumption is that primary sensory signals, in general code for local properties, vary quickly while the perceived environment changes slowly. Succeeding in extracting slow features from a quickly varying sensory signal is likely to result in obtaining an invariant representation of the environment [6] [8].

Based on the normalization approach, a dynamic link matching (DLM) approach has been first proposed by Konen et al [46]. This approach consists of connecting two layers of neurons through synaptic connections that are constrained by a normalization. A known pattern is applied to one of the two layers, and the pattern to be recognized to the other layer. Dynamics of the neurons are chosen in such a way that "blobs" are formed randomly in the layers. If features of the blobs respectively in the two layers are similar enough, a weight strengthening and an activity similarity will be detected between the two layers, for example by correlation computation [49] [46]. These blobs may or may not correspond to a segmented region of a visual scene, since their size is fixed in the whole simulation period and is chosen by some parameters in the dynamics of the network [46]. The apparition of blobs in the network has been linked to the attention process present in the brain by the developers of the architecture.

The dynamics of the neurons used in the original DLM network are not dynamics of a spiking neuron. In fact, the behavior of neurons from a DLM network is based on rate coding, i.e. average neuron activity over time, and can be shown to be equivalent to an enhanced dynamic Kohonen Map in its Fast Dynamic Link Matching (FDLM) [46].

In summary, the systems described hereinabove are supervised and non-autonomous, or include two operating modes which are learning and recognition.

Other systems such as those described in U.S. Pat. No. 6,242,988 B1 (Sarpeshkar) issued on Jun. 5, 2001 and entitled "Spiking Neural Circuit", and U.S. Pat. No. 4,518,866 issued to Clymer on May 21, 1985 and entitled "Method of and Circuit for Simulating Neurons", make use of bio-inspired neural networks (or spiking neurons) including electronic circuitry to implement neurons, but do not provide any solution to spatio-temporal pattern.

The other following United States patent documents describe solutions to spatio-temporal pattern recognition that do not use bio-inspired neural networks (spiking neurons). They either use conventional (non-spiking) neural networks or expert systems:

| No. | Title | Issued | Inventor |
| --- | --- | --- | --- |
| 5,664,065 | Pulse-coupled automatic object recognition system dedicatory clause | Sep. 02, 1997 | Johnson |
| 5,255,348 | Neural network for learning, recognition and recall of pattern sequences | Oct. 19, 1993 | Nenov |
| 6,067,536 | Neural network for voice and pattern recognition | May 23, 2000 | Maruyama et al. |
| 2003/0228054 | Neurodynamic model of the processing of visual information | Dec. 11, 2003 | Deco |

SUMMARY OF THE INVENTION

To overcome the above discussed drawbacks of the prior realizations, there is provided, in accordance with the present invention, a system for characterizing a pattern, the system comprising: a spiking neural network having at least one layer of neurons, the spiking neural network defining a plurality of connections between neurons for transmitting signals between the connected neurons; a model for inducing spiking in the neurons; a global regulating unit; connections between each neuron and the global regulating unit for transmitting signals between the neuron and the global regulating unit; and connections between each neuron and at least one other neuron for transmitting signals between this neuron and the at least one other neuron, this neuron and the at least one other neuron being on the same layer. Spiking of each neuron is synchronized according to a number of active neurons connected to this neuron. The system comprises a supplier of at least one pattern to the spiking neural network for generating sequences of spikes in the spiking neural network, the sequences of spikes (i) being modulated over time by the synchronization of the spiking and (ii) being regulated by the global regulating unit. The system finally comprises a characterizer of the at least one pattern according to the sequences of spikes generated in the spiking neural network.

The present invention also relates to a method for characterizing a pattern, the method comprising: providing a spiking neural network having at least one layer of neurons, the spiking neural network having a plurality of connected neurons for transmitting signals between the connected neurons; specifying a model for inducing spiking in the neurons; connecting each neuron to a global regulating unit for transmitting signals between the neuron and the global regulating unit; connecting each neuron to at least one other neuron for transmitting signals from this neuron to the at least one other neuron, the neuron and the at least one other neuron being on the same layer; synchronizing spiking of each neuron according to a number of active neurons connected to this neuron; submitting at least one pattern to the spiking neural network for generating sequences of spikes in the spiking neural network, the sequences of spikes (i) being modulated over time by the synchronization of the spiking and (ii) being regulated by the global regulating unit; and characterizing the at least one pattern according to the sequences of spikes generated in the spiking neural network.

The foregoing and other objects, advantages and features of the present invention will become more apparent upon reading of the following non restrictive description of illustrative embodiments thereof, given by way of example only with reference to the accompanying drawing.

BRIEF DESCRIPTION OF THE DRAWINGS

In the appended drawings:

FIG. 1A is a graph showing spiking events that are temporally-organized;

FIGS. 1B and 1C are graphs showing non synchronized discharge of neurons;

FIG. 13 represents the 6 best-matching bases found for the initial 15 faces of FIG. 11;

FIG. 27 shows Table 1 which illustrates the use of the correlation of histograms of segment's size in relation with the phase.

DETAILED DESCRIPTION

In the following description, non-restrictive illustrative embodiments of the system and method according to the present invention will be described with reference to the appended drawings. More specifically, the non-restrictive, illustrative embodiments are concerned with characterizing sequences of spikes generated by neurons of a spiking neural network when a pattern is submitted to the spiking neural network after the latter is stabilized. The system and method according to the present invention can perform, for example, clustering or segmentation through synaptic weight values. Shape identification and recognition is embedded into local excitatory and global inhibitory connections and spiking synchronization.

In the following description, "pattern" is to be construed in a broad sense. For example, a pattern can be an audio signal, a video signal, a signal representing an image, including 3D images, or any entity that can be represented by a signal.

Figure 2:
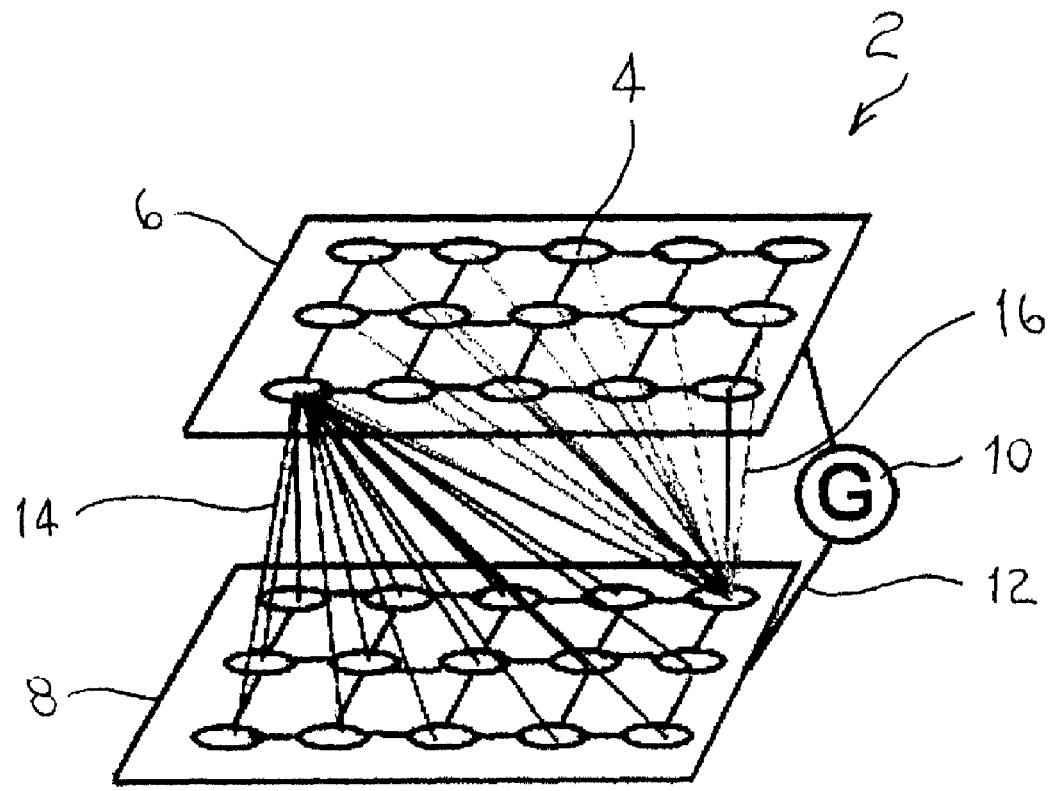
FIG. 2 illustrates a RN-Spikes neural network comprising two layers of neurons.

The spiking neural network used in the non-restrictive, illustrative embodiments described herein is a RN-Spikes neural network. FIG. 2 shows such a RN-Spikes neural network 2. The RN-Spikes neural network 2 is a multilayer neural network made of spiking neurons such as 4. In the present illustrative embodiments, the RN-Spikes neural network 2 has two layers 6 and 8 of spiking neurons 4. Of course, the RN-Spikes neural network such as 2 can have an arbitrary number of layers such as 6 and 8. Each neuron 4 of the RN-Spikes neural network 2 has a bidirectional connection such as 12 with a global regulating unit 10 for transmission of excitatory signals and/or inhibitory signals between the neurons 4 and the global regulating unit 10.

Also, each neuron 4 of both layers 6 and 8 receives local excitatory connections and/or global excitatory connections from neurons of the same layer. Each neuron 4 from the same layer 6 or 8 also receives an inhibitory signal from the global processing unit 10.

The layers 6 and 8 communicate with each other since at least one neuron 4 of the layer 6 can receive excitatory and/or inhibitory signals from neurons of the layer 8 (see connections 14), and at least one neuron 4 of the layer 8 can receive excitatory and/or inhibitory signals from neurons of the layer 6 (see connections 16).

In general, the number of layers of a RN-Spikes neural network is chosen depending on the application. For example, a RN-Spikes neural network having N layers is advantageously used for simultaneously finding a common object in N images.

The types of connections, i.e. inhibitory connections and/or excitatory connections, between the neurons 4 are chosen according to the application. For example, an audio application advantageously uses a one layer RN-Spikes neural network 2 having full bidirectional excitatory and inhibitory connections between the neurons 4. In other applications, it is possible to use local connections on each layer but global connections between the layers.

Figure 3:
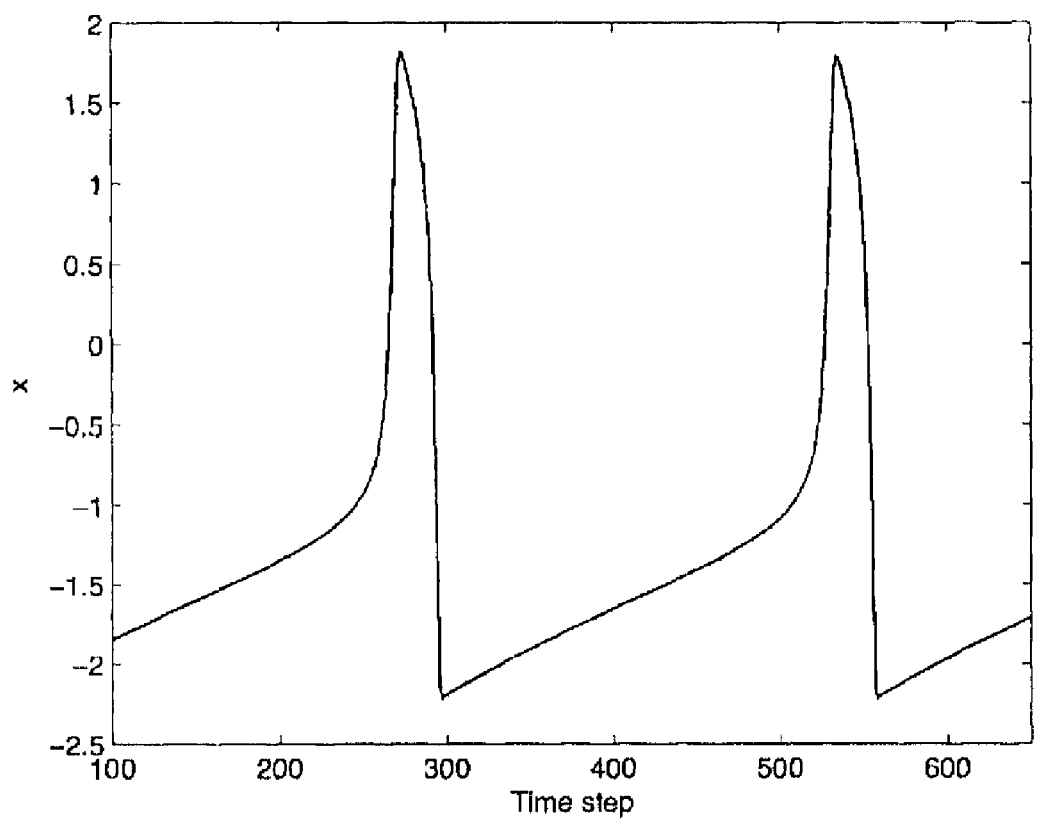
FIG. 3 is a graph showing the output x of Terman-Wang oscillator.
Figure 4:
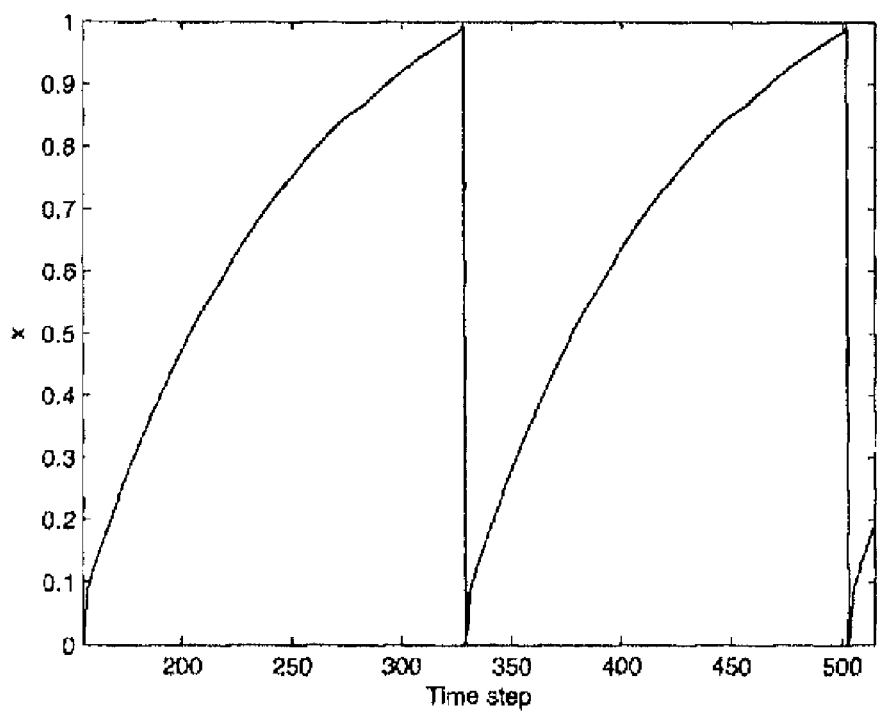
FIG. 4 is a graph showing the output x of an IaF model.

The RN-Spikes neural network 2 can use different neuron models, or combinations and adaptations thereof, for inducing spiking in the neurons 4. Example of such models are the Wang and Terman model, integrate-and-fire model, resonate-and-fire model, quadratic integrate-and-fire model, Izhikevich model, FitzHugh-Nagamo model, Moris-Lecar model, Wilson Polynomial Neurons, Hodgkin-Huxley model. FIGS. 3 and 4 give examples of the Wang and Terman model and the integrate-and-fire model, respectively, wherein H(x(i,j;t)) defines a spiking output of neuron neuron(i,j), H(x) being the Heaviside function.

Synaptic weights $w_{i,j,k,m}(t)$ between neurons (i,j) and (k,m) are dynamic and can vary over time t depending on the input signals received by neurons (i,j) and (k,m), RN-Spikes activity, the functioning mode of RN-Spikes, and the synchronization of RN-Spikes. Therefore, the synaptic weights can be adapted and need not be constant.

More specifically, the synaptic weight $w_{i,j,k,m}(t)$ between neuron(i,j) and neuron(k,m) can be computed using the following formula:

$$w_{i,j,k,m}(t) = \frac{1}{\text{Card}\{N(i,j)\}} \frac{v(t)}{\Omega(p(i,j;t), p(k,m;t))} \quad (1)$$

wherein:
$w_{i,j,k,m}(t)$=weight between neuron (i,j) and neuron (k,m) at time t;
p(i, j;t)=external input to neuron (i,j) at time t;
p(k,m;t)=external input to neuron (k,m) at time t;
N(i, j)=set of all neurons connected to neuron (i,j);
Card{N(i,j)}=number of elements in the set N(i,j);
v(t)=v(t)=function characterizing a level of activity of the spiking neural network at time t; and
$\Omega(p(i,j;t), p(k,m;t))$=any linear or nonlinear function of p(i, j;t) and p(k, m;t).

The external input values p(i, j;t) and p(k,m;t) are normalized. O(.) can be an exponential function, a cubic function, a square function or any other linear or nonlinear function of the external inputs p(i,j) and p(k,m) at time t.

Depending on the functioning mode, connections between neurons can be suppressed or established during processing. For example, in a segmentation mode, connections between the layers 6 and 8 of FIG. 2 are not established while, during a matching mode, connections between layers 6 and 8 which are to be compared are established. In the RN-Spikes neural network 2, the layers 6 and 8 can independently be in a segmentation mode, a matching mode or a comparison mode.

Local connections whether inside the same layer or between different layers are excitatory connections, while inhibitory connections are made with the global regulating unit 10.

In situations where the weights $w_{i,j,k,m}(t)$ are not adapted and for a specific situation, equation (1) can be reduced, in a non limitative example, to the following equation (2):

$$w_{i,j,k,m}^{ext}(t) = \frac{w_{max}^{ext}(t)}{\text{Card}\{N^{ext}(i,j) \cup N^{int}(i,j)\}(t)} \cdot \frac{f(i,j,k,m;t)}{e^{\lambda|p(i,j;t)-p(k,m;t)|}} \quad (2)$$

where $w_{max}^{ext}(t)$ and Card$\{N^{ext}(i;j) \cup N^{int}(i;j)\}$ are normalization factors, with Card$\{N(i;j)\}$=Card$\{N^{ext}(i;j) \cup N^{int}(i;j)\}$ while $e^{\lambda|p(i,j;t)-p(k,m;t)|}$ characterizes the distance between the inputs of neurons (i,j) and (k,m), with f(i,j,k,m;t) being any non-linear function of the neural network activity evaluated at time t for neurons (i,j) and (k,m). In the remaining part of the present specification and when not otherwise stated, it is assumed that the weights follow the form of equation (2).

The function f is used to guide, constraint and focus the neural network response depending on its past and actual activity. Furthermore, f depends on the application to be developed. The subsequent sections illustrate two examples of expressions f(i,j,k,m;t), one that takes into consideration the average color of segments and the other that considers the shape of the segments. Of course, the present invention is not limited to these two examples.

$$\frac{w_{max}^{ext}(t)}{\text{Card}\{N^{ext}(i,j) \cup N^{int}(i,j)\}(t)}$$

is a normalization factor that depends on the neural network activity and that can be implemented in many ways. It can be updated every time a neuron fires or after many spikes of the same neuron or after completion of a full oscillatory period (after the firing of each active neurons). Although the present specification presents various ways of updating that normalization factor, the present invention is not limited to these particular examples.

For ease of implementation, the term $$\frac{w_{max}^{ext}(t)}{\text{Card}\{N^{ext}(i,j) \cup N^{int}(i,j)\}(t)}$$

from equation (2) can be split into a first expression that is static (that does not depend on the network activity) and a second expression that changes depending on the network activity and behavior.

Let us come back to equation (1). The sums $$\sum_{k;m \in N^{ext}(i;j)} \text{ and } \sum_{k;m \in N^{int}(i;j)}$$

can be evaluated from a static point of view or dynamically, depending on the activity of the neural network. Different implementations are presented in this specification. One solution considers that the sets $$\sum_{k;m \in N^{ext}(i;j)} \text{ and } \sum_{k;m \in N^{int}(i;j)}$$

are constants while another solution considers only the active neurons at a specific instant t or on a short time interval.

Two patterns (not shown) can be submitted to the RN-Spikes neural network 2 for comparison with each other. The two patterns can be submitted to the layers 6 and 8, respectively. Depending on the characteristics of the two patterns, the response of the RN-Spikes neural network 2 can be categorized roughly in the three following classes:

same patterns;
comparable patterns; and
different patterns.

When the two patterns are substantially similar, the activity of the neurons of the RN-Spikes neural network 2 tends to stabilize, while this may not be the case with dissimilar patterns. More specifically, the number of spikes in a time interval, or during one comparison iteration, depends on the similarity of the two patterns submitted. For example, the RN-Spikes neural network 2 presents a greater activity and a faster stabilization of synchronous activity for two similar images than for two dissimilar images.

Accordingly, it is desirable to define a similarity criterion depending on the activity in the RN-Spikes neural network 2 so that the greater is the similarity between the two patterns submitted, the greater is the activity in the RN-Spikes neural network. One possible similarity criterion is the number of computations being made during one comparison iteration. Another possible similarity criterion is the average number of spiking neurons during one or many comparison iterations. The latter similarity criterion provides an estimate of the similarity between the two patterns without having to wait for a complete stabilization of the RN-Spikes neural network 2.

Figure 5:
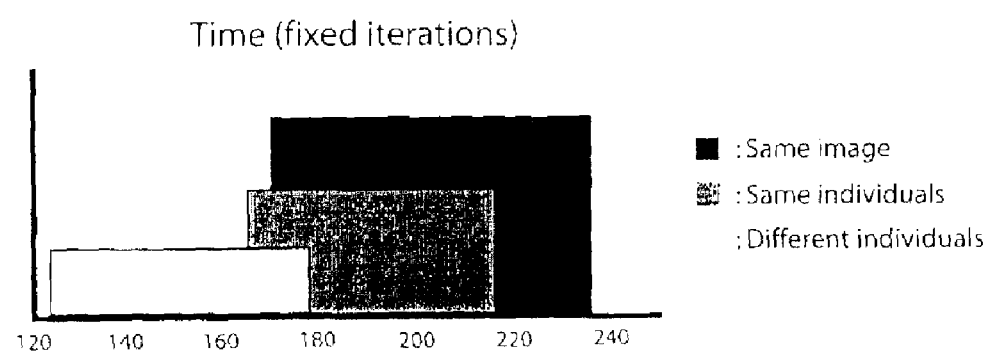
FIG. 5 is a graph showing global activity, measured in CPU time, for three types of images: i) same image of the same individual, ii) different images of the same individual and iii) images of different individuals, wherein front images of men and women from the FERET database, reduced to 50×75 pixels were used and wherein around 30 tests on 30 individuals were conducted to build the graph.

FIG. 5 is a graph showing simulation times for a fixed number (3000) of segmentation and matching iterations in three different situations. The same image is used twice, two different images of the same individual and two images of different individuals are used. During the transition phase from initialization to stabilization, similar images bring higher values of simulation times, since a greater number of neurons fire at each iteration. On the contrary, different images yield short simulation times, since a smaller number of neurons fire during each iteration. Indeed, if matching regions emerges (more frequent in similar images), more neurons will occupy each given region, and more neurons will fire at each iteration. This yields more operations. On a very slow computer, different images of the same individual give an average of high values (between 164 and 217 seconds) while images of different individuals yield low to average values (between 122 and 178 seconds).

In accordance with the theory of neural network, all neurons 4 tend to have a same discharge frequency, however with different phases. This fact can be used for enhancing the reliability of decisions made according to the present invention and also for defining a condition as to when to stop the neuronal network.

In order to compute all spiking frequencies of neurons 4 in the RN-Spikes network 2, it is required to keep track of a last discharge time and also of a last discharge period. Period is used instead of frequency for simplifying mathematical operations. As all neurons 4 are unitary objects in the RN-Spikes neural network 2, for each of them three new parameters are added to their class definition in the simulator: a moment of last spiking, a period of last spiking sequence and a variation of the spiking period.

In the simulator, the three parameters mentioned hereinabove can be defined as below.

double LastFire; /* keep moment of last fire (=regionID time) */ double FirePeriod; /* keep period of last firing sequence (current-last time) */ double DeltaPeriod; /* keep variation in fire period (hypothesis: if all delta) */ /* period=0 for a cycle, all neurons are stable */

Values of the three (3) above-mentioned parameters are acquired when methods of discharge of the neurons are called in the simulator. The variation of the spiking period is the variation of period between the current and the previous spikings. FirePeriod is set after the previous calculation to reflect the current period of firing and LastFire is updated with the current discharge time.

tmpPeriod=timeof-LastFire;

DeltaPeriod=FirePeriod−tmpPeriod;

FirePeriod=tmpPeriod;

LastFire=timeof;

With these parameters, it is possible to define a stabilization coefficient $C_{stabilization}$. In this non restrictive illustrative embodiment, $C_{stabilization}$ is defined as an average of all computed DeltaPeriod of the simulation iteration. More specifically:

$$C_{stabilization} = \frac{\sum_{n}^{N_{neuron}} \Delta_{period_n}}{N_{neuron}} \quad (3)$$

Graphs of period variation show different reactions of the RN-Spikes neural network 2 for a segmentation or a matching phase of a simulation based on images submitted to each layer 6 and 8.

The same behavior is observed during the matching stage. There is a relation between stabilization times and similarities of images assigned to neuronal network layers. There are some exceptions, but all neurons start to be synchronized sooner when images are the same or with minor differences than with different images. As the DeltaPeriod parameter $\Delta_{period_n}$ presents fluctuations between cycles, it is possible to average this parameter $\Delta_{period_n}$ on a fixed number of iterations.

After stabilization of the RN-Spikes neural network, the distribution of phases can be used to characterize the inputs. The distributions of the various parameters are estimated as a function of the phases. The following illustrates the estimation of two types of histograms.

Histogram vectors are evaluated from regions (segments) in each layer. In a given layer (for example layer $L_1$), for a specific region ($R_i$ with a specific phase $\phi_i$) the number of neurons is counted and is reported in vector $H_1$ in the same coordinate as the one that is used for histogram $H_2$ for the same phase $\phi_i$. In other words, after matching, a list is made of all the phases present in the network. Then an index is associated to each phase. That index is a pointer on the coordinates of the vectors $H_1$ and $H_2$. The example below clarifies the way $H_1$ and $H_2$ are obtained.

Let us suppose that after matching, layer $L_1$ has three regions (segments) $R_1$, $R_2$ and $R_3$, with phases $\phi_1$, $\phi_2$ and $\phi_3$, respectively, and that layer $L_2$ has three regions (segments) $R_4$, $R_5$ and $R_6$, with phases $\phi_4$, $\phi_5$ and $\phi_6$, respectively. If, for example, there are only two regions: $R_2$ in the first layer and $R_5$ in the second layer that have the same phase $\phi_2=\phi_5$, therefore, the two vectors $H_1$ and $H_2$ will have a dimension of five (5) phases and will be indexed by a sequence of phases $\phi_1$, $\phi_2$, $\phi_3$, $\phi_4$, $\phi_5$.

That is:

$$H_1 = [\text{Card}(R_1), \text{Card}(R_2), \text{Card}(R_3), 0, 0] \quad (4)$$

and $$H_2 = [0, \text{Card}(R_5), 0, \text{Card}(R_4), \text{Card}(R_6)] \quad (5)$$

wherein $\text{Card}(R_i)$ is the number of neurons from region $R_i$.

In another embodiment, instead of using the number of neurons in a segment (region), the value of the parameter $P^2/S$ is used for the segment, wherein P is a perimeter and S is a surface of the segment. Histograms that are a combination of the previous ones are also generated.

The following illustrates the use of histograms on an implementation that was made based on a correlation coefficient, as defined hereinbelow.

After running the RN-Spikes neural network 2, the result is encoded in the phases of the impulse time. In order to evaluate the similarity between two images, a normalized correlation between histograms is used:

$$R(H_1, H_2) = \frac{E[(H_1 - E[H_1])(H_2 - E[H_2])]}{\sqrt{E[(H_1 - E[H_1])^2]}\sqrt{E[(H_2 - E[H_2])^2]}} \quad (6)$$

where $H_1$ and $H_2$ are histograms, and the operator E represents the mathematical expectation.

The following equivalent formulation has been implemented:

$$R(H_1, H_2) = \frac{E[(H_1[n] - E(H_1))(H_2[n] - E(H_2))]}{\sqrt{E(H_1[n]^2) - E^2(H_1[n])}\sqrt{E(H_2[n]^2) - E^2(H_2[n])}} \quad (7)$$

FIG. 27 shows Table 1 which illustrates the use of the correlation of histograms of segment's size in relation with the phase.

Image Processing Applications

RN-Spikes can be used to process images, when it is used in a segmentation mode, and then to compare the latter during a matching mode. As already stated hereinabove, the number of layers of the RN-Spikes neural network, or any other spiking neural network, is not limited to two. In fact, some layers can segment different images while others perform a comparison between the segmented images. After segmentation, objects inside an image are multiplexed in time and can be filtered out of the image when looking at the activity of the network during a short time slice window (specific to that object to be extracted). These objects can be compared with those of other layers, which are also multiplexed in time.

Sound Processing Applications

RN-Spikes can also be used to process sound. For example, in the context of the sound source separation problem and with the RN-Spikes network, auditory objects can be multiplexed in time intervals, such as TDM (Time-Division Multiplex) in telecommunications, from a period of oscillatory neurons (instead of being encoded into vector coordinates). Auditory objects coming from a same source can be retrieved from a same time interval of a multiplexing time frame, i.e. a frame length being the period T of the oscillatory neurones). In this context, source separation is reduced to a simultaneous segmentation and fusion of auditory objects. Analysis and recognition are realized simultaneously without any training of the RN-Spikes neural network Video Processing Applications In video and sound processing, representations based on objects are used. Once they are found in a video or in a sound signal, objects can be tracked and localized. Nowadays, video or sound coders, for example, are parametric and do not take into consideration the representation of the information in terms of scenes where objects are present. The RN-Spikes neural network is able to find objects in images (also in auditory images) and is plastic. From the previous equation, it can be seen that connections can change depending on the external input values p(i,j;t) (objects in the image) and on the neural activity (respective spiking time between neurons). It is therefore possible to track the objects in a sequence of images and therefore, to encode their position at each time frame.

RN-Spikes Using a Sparse Non-Negative Matrix Factorization

Olshausen [A8] has shown that sparse representation can be used to obtain overcomplete mathematical bases, in a vectorial space. An overcomplete base is a set that has more bases than the dimensionality of data. Overcompleteness in the representation is important because it allows for the joint space of position, orientation, and spatial-frequency to be tiled smoothly without artifacts. In other words, overcomplete bases are shift invariant [A9]. More generally though, it allows also for a greater degree of flexibility in the representation, as there is no reason to believe a priori that the number of causes for images is less than or equal to the number of pixels [A10].

Overcompleteness and sparseness do not guaranty by themselves that the representation is part-based. Part-based representations are important in signal processing and artificial intelligence, since they allow us to extract the constituent objects of a scene. One way of achieving part-based analysis is the use of non-negative kernels in a linear model. Since each signal is generated by adding up the positive (non-negative) kernels no part of the kernel can be cancelled out by addition. Therefore, the basis must be parts of the underlying data. Combining sparseness and non-negativity gives a suitable representation for sensory signals (audio, image, etc.).

There are two main approaches to get sparse (and if necessary non-negative) representations. In the first approach, it is assumed that the overcomplete kernels are known and the signal is projected on the bases to get a sparse representation. This approach has been used for speech processing [A9]. In [8], Gabor Jets are used to generate sparse representations for image. The second approach used in this work is to assume that the kernels are unknown and to find the kernels by optimizing a cost function comprising an error function with additional constraints for sparseness and/or non-negativity. The advantage of the second approach is that it does not need any a priori assumption on the shape of the kernels and the kernels are adapted to the underlying training signal resulting in more flexible kernels, while the advantage of the first approach is a faster convergence rate.

Shift and size invariance are the key points in the sparse coding parameter considered in this report. In [A14], Simoncelli et al have shown that although sparse representations with wavelets can be obtained, the aforementioned representations are not shift and size invariant. The reason why shift invariance is achieved in our paradigm is the overcompleteness of the bases.

The following non-restrictive illustrative embodiments describe various techniques to find solutions for the second paradigm used to extract fiducial regions in ID photos.

In one embodiment a deterministic approach based on constrained steepest gradient is used. As explained hereinbelow, a cost function for sparse non-negative matrix factorization is non-convex. Therefore, a deterministic approach gets stuck in local minima. In another embodiment, a probabilistic simulated annealing is used to find an optimal global solution.

Sparse Non-Negative Matrix Factorization Based on Gradient Projection Optimization This embodiment is a deterministic approach for finding a sub-optimal solution by steepest descent.

The optimization problem in hand is the following:

$$\text{minimize } f = \|v - wh\| + \Sigma v \tag{8}$$

such that $$v_{ij} > 0 \tag{9}$$

$$w_{i,j} > 0$$

$$\alpha < kurt(x) < \beta$$

$$kurt(x) = \frac{1}{N\sigma_x^4} \sum_i \{x_i - \bar{x}\}^4 - 3$$

where kurt(x) is the kurtosis of x. x can either contain both w and h or one of them.

$$\frac{1}{N\sigma_x^4}$$

is a regularization term. Direct optimization of this constrained problem can become ill-posed and time consuming. Therefore, a gradient projection method is used for this embodiment. The pertaining method is based on projecting a search direction into a subspace tangent to the active constraints. More specifically the method proposed by Haug and Arora [A15] is used, this method being more suitable for nonlinear gradient projection optimization. The algorithm consists of two phases. In the first phase (projection move), optimization is done along the tangent linearized cost function with constraints. In the second phase, the restoration move is done by bringing the parameters back to the constraints boundaries. The approach of this embodiment is different from the geometrical gradient approach proposed by [12]. The method proposed by [12] is limited to the L1-norm/L2-norm ratio proposed therein and cannot be extended to other sparseness measures such as population kurtosis used in [A12]. In the method of this embodiment, a sparseness constraint can be replaced without altering undertaken steps. In addition, the method according to the present embodiment can impose sparseness constraint on both w and h. This is not the case for the method proposed in [12] in which either w or h must be chosen sparse but not both. The LNMF method proposed by Li et al. [A16] uses the sum of the square of coefficients as a sparseness measure. This approach performs better than the original NMF (Normalized Matrix Normalization) but extracts cheeks, forehead, and jaw that are not discriminant features for recognition.

The method according to the present embodiment is as follows:

Start with the initial condition $x = x_0$. x is a one-dimensional vector comprising all the elements of w and h in a row.
Set the improvement in the objective function parameter $r = r_0$.

Identify all active constraints. Active constraints are those constraints that are violated by x. If the set is non-empty (at least one constraint is violated) decrease □, otherwise increase □.

Form the matrix. Should the kurtosis constraint be violated, its derivative would be calculated analytically by:

$$\nabla k(x) = \frac{4}{N\sigma_x^4} \sum_i \{x_i - \bar{x}\}^3 E \tag{10}$$

$E = [111 \ldots 1]^T$ is a vector of ones.
Compute $P = I - N(N^T N)^{-1} N^T$
Compute the projection move direction as $s = -P\square f$. Normalize s.
Compute $$\alpha = -\frac{\rho f}{s^T \nabla f} \tag{11}$$

For all violated constraints, calculate vector $g_a$. Vector $g_a$ is the value of violated constraints at the working point x.
Update x according to the combined projection and restoration moves.

$$x_{i+1} = x_i + \alpha s - N(N^T N)^{-1} g_\alpha \tag{12}$$

Figure 6:
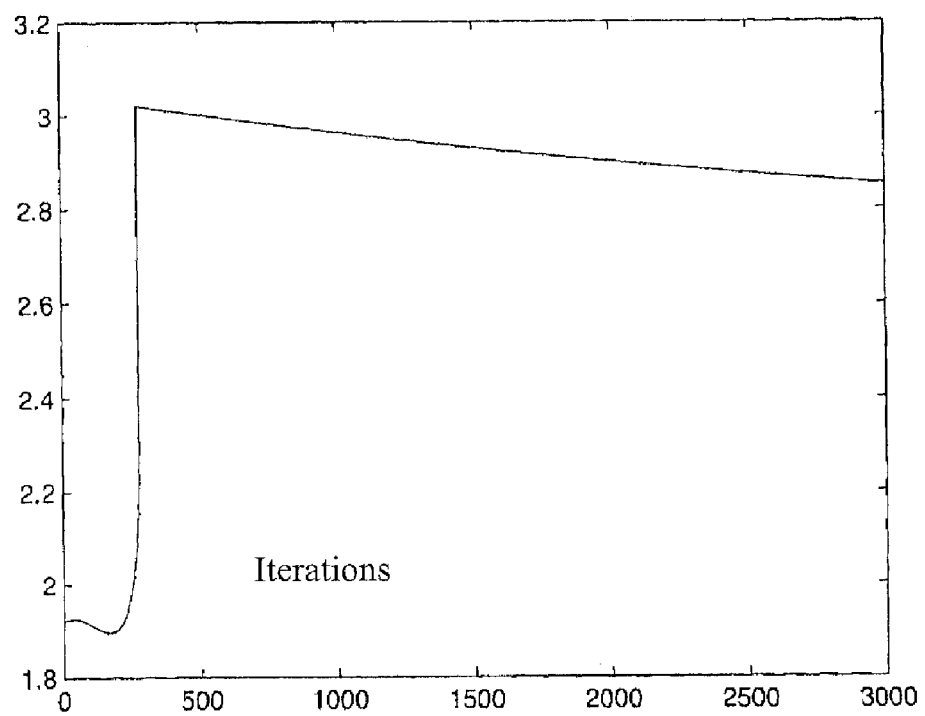
FIG. 6 is a graph showing the evolution (through iterations) of the kurtosis for the extraction of the NMF basis for a dataset of 20 different signals, wherein each signal is 100 sample long and the constraint used in the algorithm consists of keeping the kurtosis between 2 and 3.

FIG. 6 shows the evolution of the kurtosis for extracting of a NMF basis for a dataset of 20 different signals. Each signal is contains 100 samples.

Figure 7:
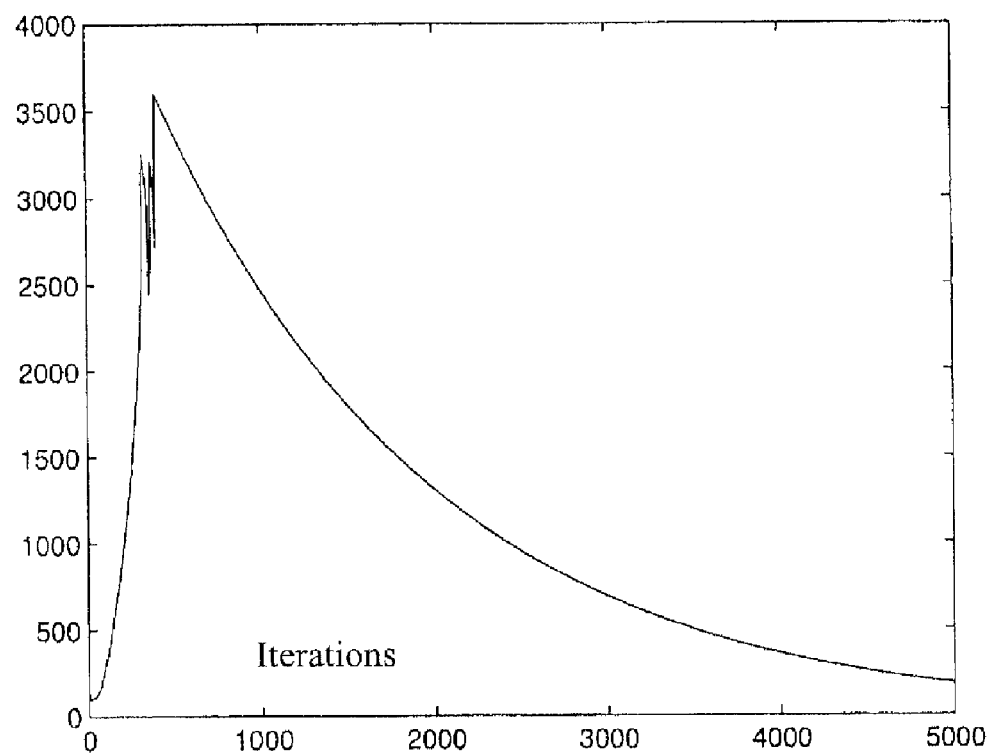
FIG. 7 is a graph showing the evolution (through iterations) of the mean-squared error for the extraction of the NMF basis for a dataset of 20 different signals, wherein each signal is 100 sample long.

Similarly, FIG. 7 shows the evolution of the mean-squared error for extracting an NMF basis for a dataset of 20 different signals. Each signal is contains 100 samples.

The method of gradients is not very effective for finding a global minimum of a cost function associated with sparse non-negative matrix factorization. Therefore, simulated annealing is used.

Simulated Annealing

Simulated annealing (SA) is a generic probabilistic for the global optimization problem, namely locating a good approximation to the global optimum of a given function in a large search space.

The name and inspiration come from annealing in metallurgy, a technique involving heating and controlled cooling of a material to increase the size of its crystals and reduce their defects. The heat causes the atoms to become unstuck from their initial positions (a local minimum of the internal energy) and wander randomly through states of higher energy; the slow cooling gives them more chances of finding configurations with lower internal energy than the initial one.

By analogy with this physical process, each step of the SA algorithm replaces the current solution by a random "nearby" solution, chosen with a probability that depends on a difference between corresponding function values and on a global parameter T, called the temperature, that is gradually decreased during the process. The dependency is such that the current solution changes almost randomly when T is large, but increasingly "downhill" as T goes to zero. The allowance for "uphill" moves saves the method from becoming stuck at local minima—which are the bane of greedier methods.

The basic steps are as follows:

The basic iteration: At each step, the SA heuristic considers some neighbor s' of the current state s, and probabilistically decides between moving the system to state s' or staying put in state s. The probabilities are chosen so that the system ultimately tends to move to states of lower energy. Typically this step is repeated until the system reaches a state which is good enough for the application, or until a given computation budget has been exhausted.

The neighbors of a state: The neighbors of each state are specified by the user, usually in an application-specific way. For example, in the traveling salesman problem, each state is typically defined as a particular tour (a permutation of the cities to be visited); then one could define two tours to be neighbors if and only if one can be converted to the other by interchanging a pair of adjacent cities.

Transition probabilities: The probability of making the transition from the current state s to a candidate new state s' is a function P(e,e',T) of the energies e=E(s) and e'=E(s') of the two states, and of the global time-varying parameter T called the temperature.

One essential requirement for the transition probability P is that it must be nonzero when e'>e, meaning that the system may move to the new state even when it is worse (has a higher energy) than the current one. It is this feature that prevents the method from becoming stuck in a local minimum—a state whose energy is far from being minimum, but is still less than that of any neighbor.

On the other hand, when T goes to zero, the probability P must tend to zero if e'>e, and to a positive value if e'<e. That way, for sufficiently small values of T, the system will increasingly favor moves that go "downhill" (to lower energy values), and avoid those that go "uphill". In particular, when T becomes 0, the procedure will reduce to the greedy algorithm—which makes the move if and only if it goes downhill.

The P function is usually chosen so that the probability of accepting a move decreases when the difference e'−e increases—that is, small uphill moves are more likely than large ones. However, this requirement is not strictly necessary, provided that the above requirements are met.

Given these properties, the evolution of the state s depends crucially on the temperature T. Roughly speaking, the evolution of s is sensitive only to coarser energy variations when T is large, and to finer variations when T is small.

Annealing schedule: Another essential feature of the SA method is that the temperature is gradually reduced as the simulation proceeds. Initially, T is set to a high value (or infinity), and it is decreased at each step according to some annealing schedule—which may be specified by the user, but must end with T=0 towards the end of the allotted time budget. In this way, the system is expected to wander initially towards a broad region of the search space containing good solutions, ignoring small features of the energy function; then drift towards low-energy regions that become narrower and narrower; and finally move downhill according to the steepest descent heuristic.

In plain English: Given an incredibly hard problem, such as finding a set of 100 numbers that fit some characteristic, for which attempting to brute-force the problem would result in several million years worth of computation, this technique attempts to quickly find a "pretty good" answer by adjusting the current "set" (in this case some random sequence of 100 numbers) until a "better" answer is found (the way the adjustment is done depends on the problem). The new set of numbers, or "neighbor", if more optimal, is then used as the current set and the process is repeated.

Sometimes a problem may arise when one approaches what is known as a local minimum, in this case, a set of numbers that is the "most optimized" for its current "region". In an attempt to find a better optimization, this technique may use various methods to "jump out of" the current "pit", such as searching for better optimizations randomly by a factor of the inverse amount of the previous adjustment. Keep in mind that implementations of this method are strictly problem specific, and so the way in which one finds an optimization will vary from problem to problem.

Constrained Simulated Annealing

In constrained simulated annealing, the search space is constrained to some geometrical configuration. For instance, in non-negative matrix factorization the search space cannot contain negative values. It is simple to implement constrained simulated annealing. For each iteration, the new values are checked to see whether they meet the constraints or not. If they do, the algorithm keeps the values as a potential solution to the problem, if they do not it will discard them. More specifically, in the non-negative matrix factorization problem, all solutions with negative values are discarded.

The Cost Function for the Sparse NMF in Conjunction with Simulated Annealing

The cost function must meet the following two requirements:

The cost function must penalize any basis reconstruction that is far from the database of images in the mean square sense.

The cost function must penalize any basis that is dense and not sparse. Sparse basis means that few elements of the given basis should be nonzero. Therefore, the sparseness criterion for the basis and the weight can be written respectively as:

$$\|w\|_1 = \sum_{ij} w_{ij} \tag{13}$$

$$\|w\|_1 = \sum_{ij} h_{ij} \tag{14}$$

The above-mentioned values are the $L_1$ norm of w and h. It has been shown in [A17] that the aforementioned criterion is equivalent to using a Laplacian prior $p(w)=(\frac{1}{2})e^{-w}$ and $p(h)=(\frac{1}{2})e^{-w}$ for w and h respectively in the generative model for sparse coding (see also [A8]). In general using the L□ norm enhances sparsity (with $0<\alpha<1$).

$$\|w\|_\alpha = \sum_{ij} w_{ij}^\alpha \tag{15}$$

Note that if w and h are whitened and $\alpha=4$, the previous criterion becomes equivalent to the population kurtosis used in [11].

Using the $L\alpha$ norm as a sparsity criterion gives the following cost function to optimize for the application in hand:

$$f = \|v - wh\| + \beta\max\left(\sum_i w_{ij}^\alpha - \theta_1, 0\right) + \gamma\max\left(\sum w_{ij}^\alpha - \theta_2, 0\right) \tag{16}$$

$$w_{ij} > 0 \tag{17}$$

$$h_{ij} > 0 \tag{18}$$

$q_1$ and $q_2$ are the target sparseness for the basis and the weights respectively. As soon as the targets are reached, these constraints are set to zero. Note that there is no guaranty that $f$ is unimodal for $\alpha<1$. That is why simulated annealing is used to circumvent local minima. The cost function imposes that each basis (h(i,:)) be sparse (note that the sparseness is not imposed on the whole vector h but on each basis separately). Note that the kurtosis is not used as a sparsity measure in contrast with sparse NMF with gradient descent. In fact, simulation results have shown that using kurtosis with simulated annealing is very slow and does not converge in a reasonable computational time.

One other important issue is that the cost function $f$ is optimized over the product wh. Therefore, w can become very large and h very small, and still the product wh remains unchanged. Large values result in large $L\alpha$ norm, and slow or no convergence. This normalization is implicity implemented in the update formula of the original non-negative matrix factorization [11] or in the modified version of the sparse basis generation in [A10]. However, this normalization is not implicitly included in our cost function. Therefore, at each iteration each row of h is normalized as follows:

$$h_j = h_j / \|h_j\|_2 \quad (19)$$

Where $h_j$ stands for the row j of h. This is a very crucial step, because without normalization no convergence is reached. The code of the whole process is in the file "loss_one.m" which is called by the "anneal.m" function in the following manner:

[minimum, fval]=anneal(((@loss_one,0.1*rand(1, number), options, faces, $k$)  (20)

number is the number of elements in w and h. k is the number of basis. options is a structure used by "anneal" for the simulation annealing parameters. The options used for our simulation is saved in "options.m". faces are the training images.

Sparse NMF Result of the Swimmer Database

The swimmer database consists of toy objects used to test the effectiveness of sparse NMF algorithms. It consists of 256 different configurations of torso, legs, etc.

Figure 8:
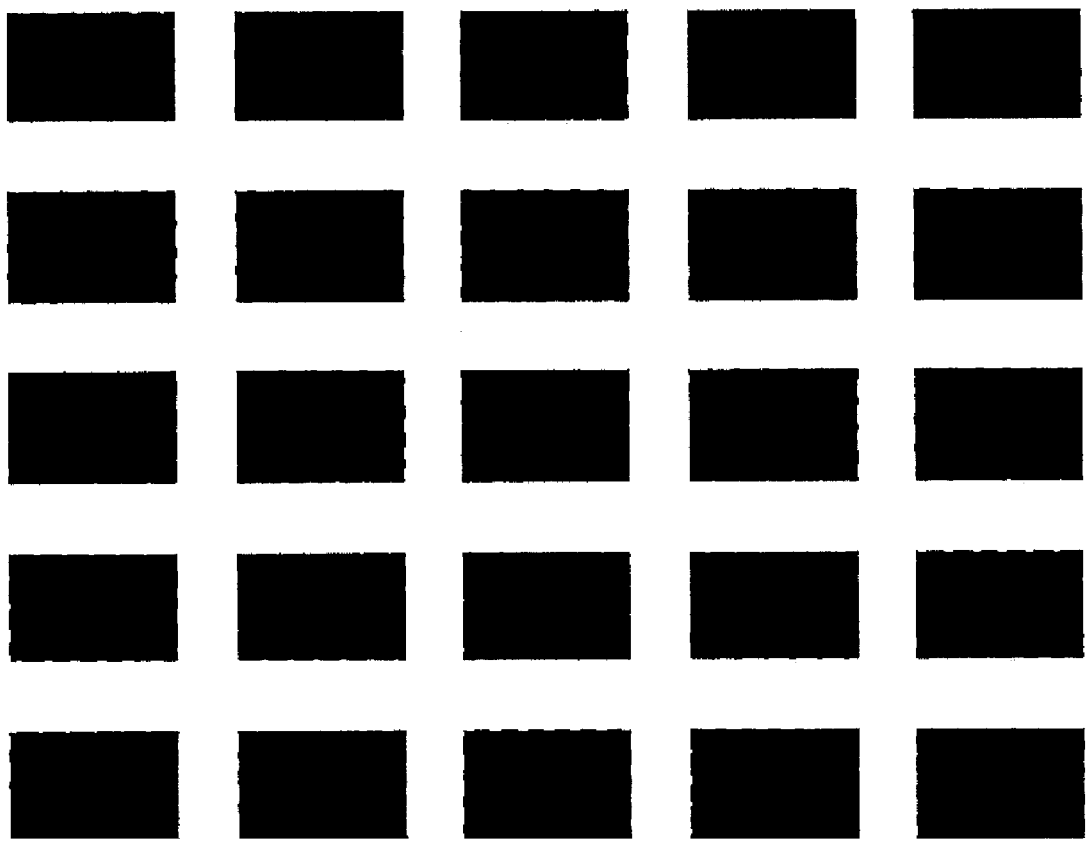
FIG. 8 illustrates part-based coding of a swimmer database by the sparse NMF simulated annealing, wherein the number of bases is set to 17.

FIG. 8 shows some of the 256 swimmer database configurations.

Using the sparse NMF simulated annealing approach, we obtain a part-based coding as depicted in FIG. 8.

Speeding Up the Simulated Annealing

In some simulations a constraint is only imposed either on w or on h, but not on both of them. In this case, it is not necessary to perform a simulated annealing parameter search on both h and w.

Without loss of generality, one can suppose that we want to find sparse bases (h) and non-sparse (w) (the opposite case is also treated in the same way). The following modified algorithm will accelerate the process. The cost function to optimize is the following:

$$f = |V - WH| + \text{sparse}(H) \quad (21)$$

sparse(H) is the constraint imposed on H (it can be the kurtosis, the L2/L1, or any other criterion). H and W are matrices and h and w are their vectorized version. The algorithm is as follows:

Initialize W and H.
Find H by simulated annealing.
Normalize H.
Find W by pseudo-inversing:

$$W = VH^+ = VH^T(HH^T)^{-1} \quad (22)$$

If the problem is ill posed, use the Tikhonov regularization:

$$W = (H^T H + \alpha^2 I)^{-1} H^T V \quad (23)$$

To see the advantage of this method. Suppose it is desired to extract 60 bases from a database of 1000 images. Each image is a 50*50 pixel image. Therefore, the vector v has 100*2500 elements, the matrix H will have 60*2500=150000 elements and the matrix W will have 30*1000=30000 elements. In this case, the computational complexity is reduced by 30000/150000=20%, because the parameter search by simulated annealing is done only on H and not on both H and W.

Figure 9:
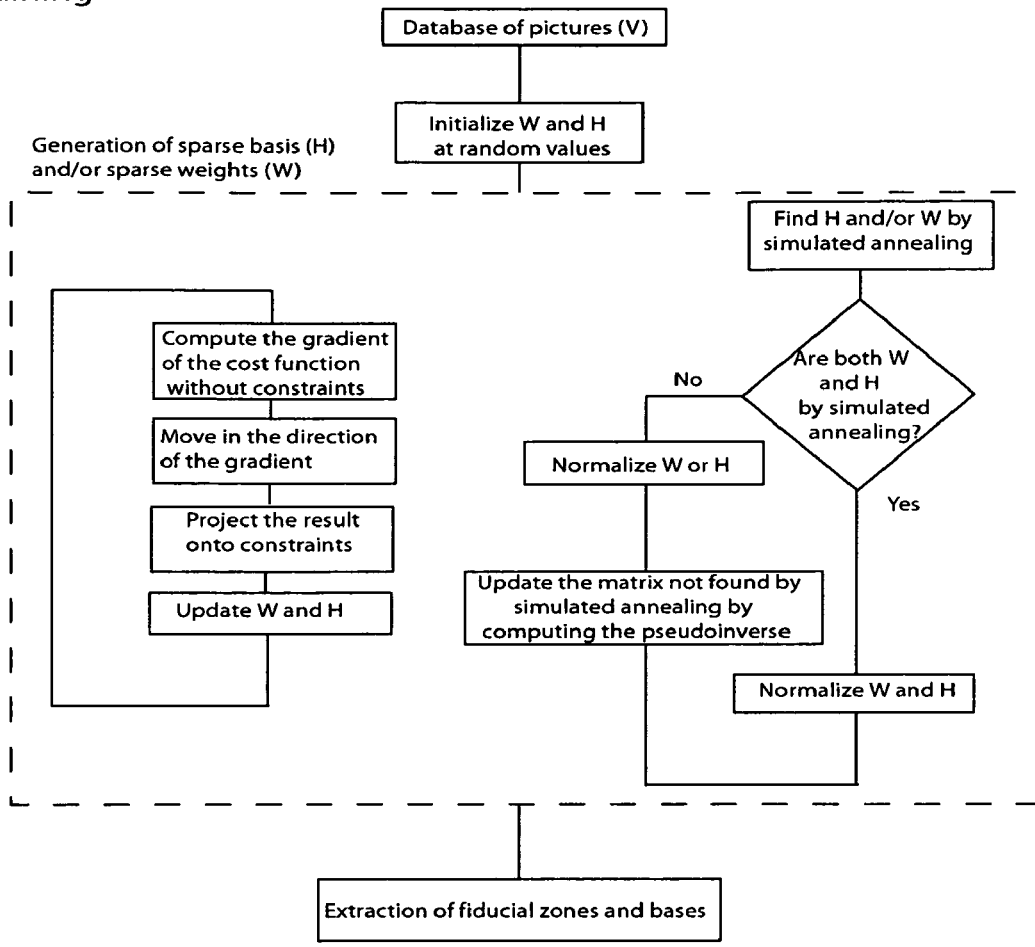
FIG. 9 is a block diagram of a training part of a sparse NMF.
Figure 10:
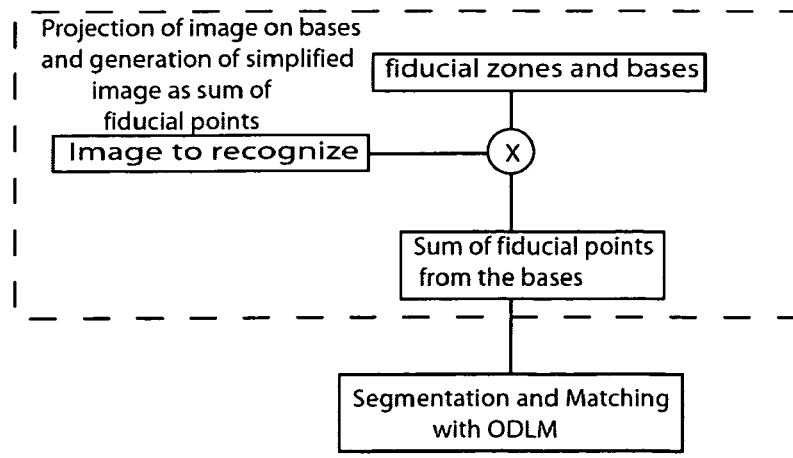
FIG. 10 is a block diagram of a recognition part of the sparse NMF.

FIGS. 9 and 10 show a block diagram for a training and recognition paths of the proposed algorithm.

Sparse NMF Result of Toy Faces

Figure 11:
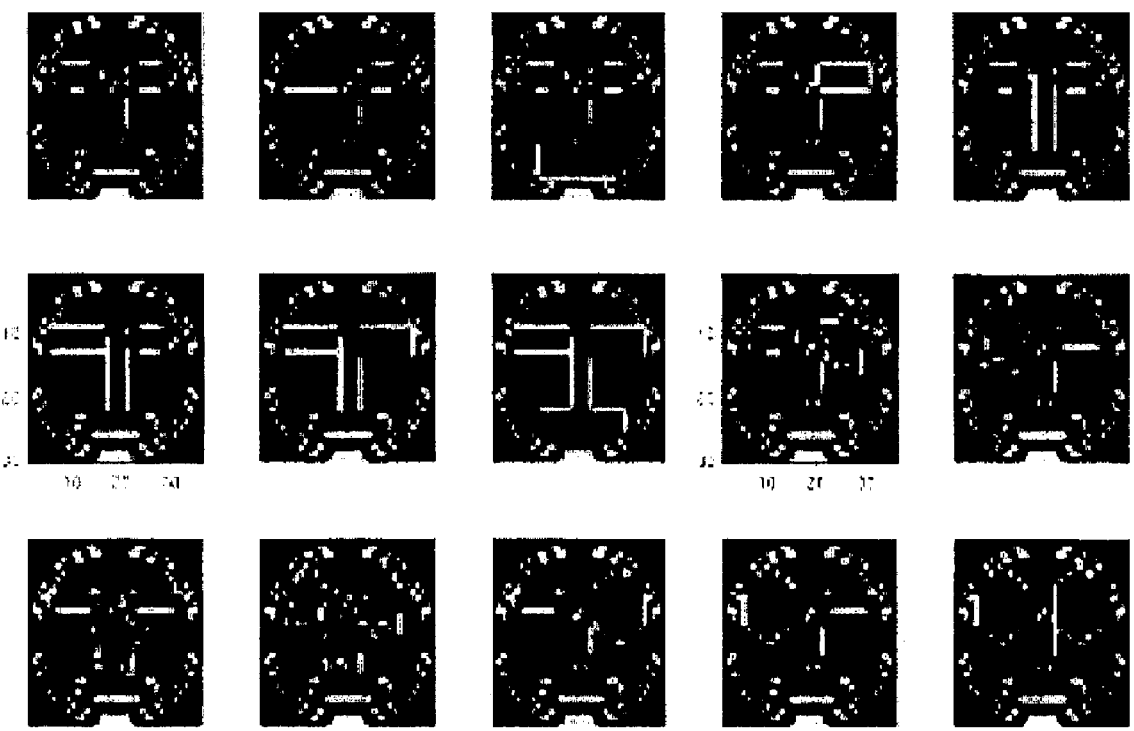
FIG. 11 is a toy face image database developed for this project.

A toy face recognition database was developed, as depicted in FIG. 11.

Figure 12:
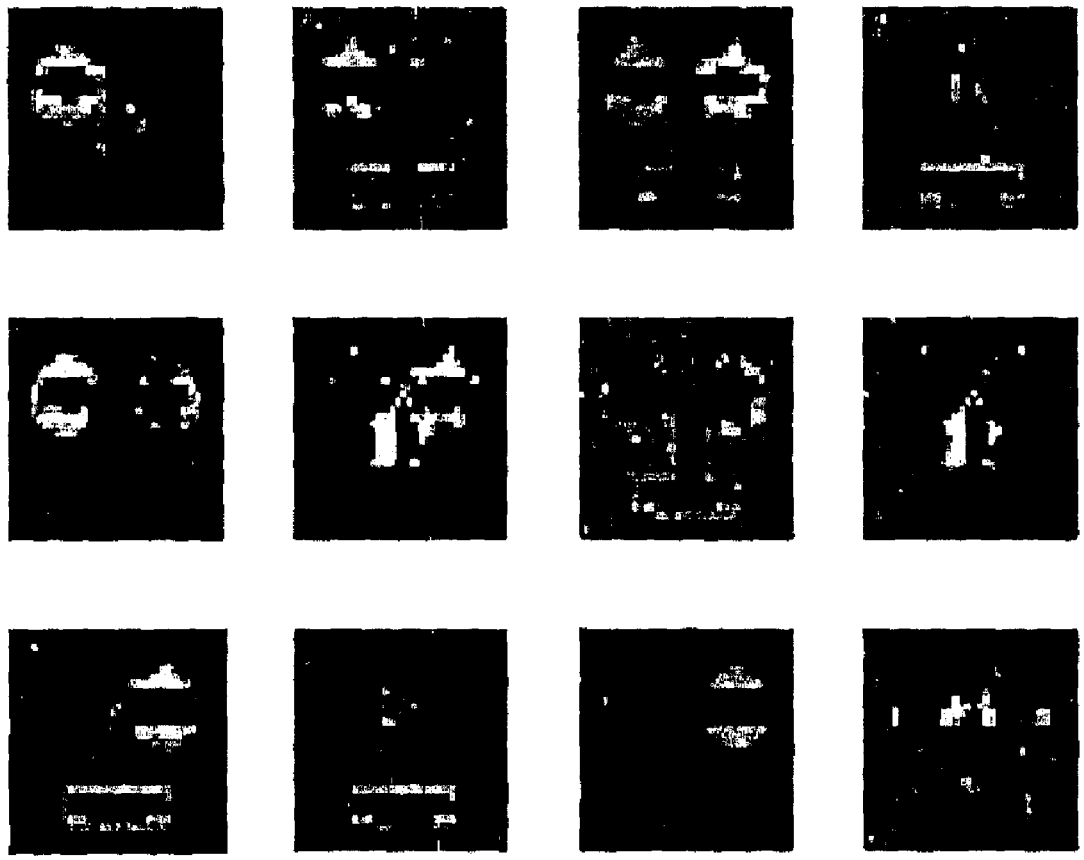
FIG. 12 represents the 12 best-matching bases found for the initial 15 faces of FIG. 11.

The same sparse NMF simulated annealing approach was applied to this database to extract 12 (FIG. 12) and 6 (FIG. 13) bases. In each case, the approach tries to find the best combinations from which all images in the initial database can be reproduced.

Sparse NMF Result on CBCL+MIT ID Picture Database

Figure 14:
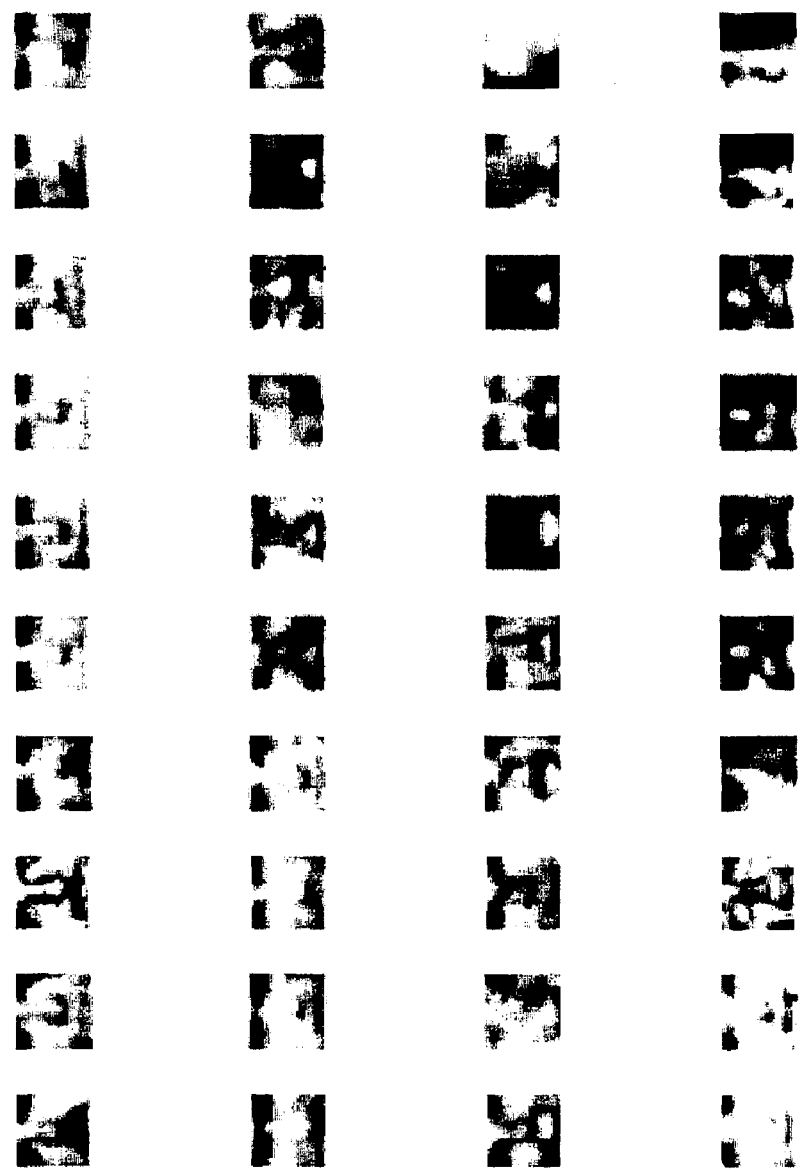
FIG. 14 represents 40 photos of the 90 photos from the CBCL database used for the training.

The CBCL+MIT database is used to test the system. Ninety (90) different photos of this database is used for this purpose, 40 of which are shown in FIG. 14.

Figure 15:
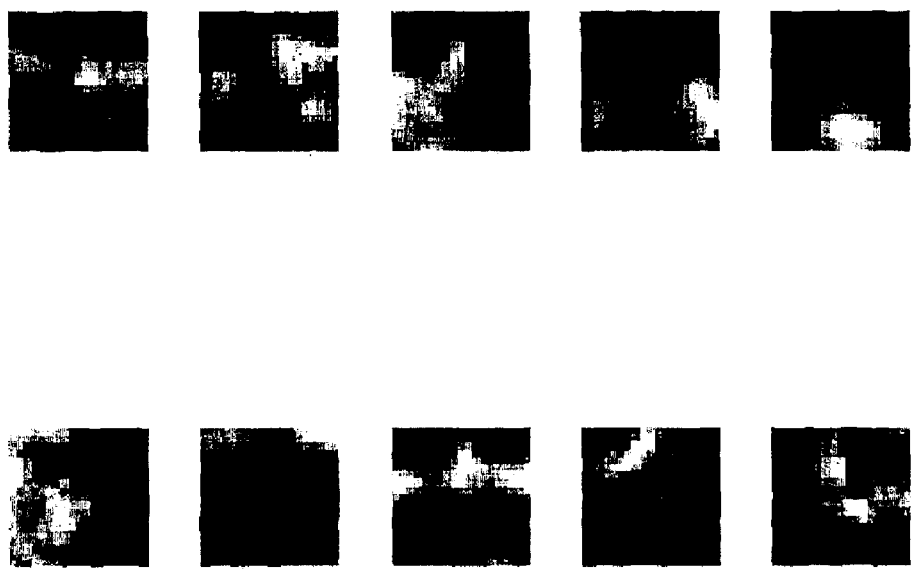
FIG. 15 represents 100 bases generated by a simulated annealing sparse NMF.
Figure 16:
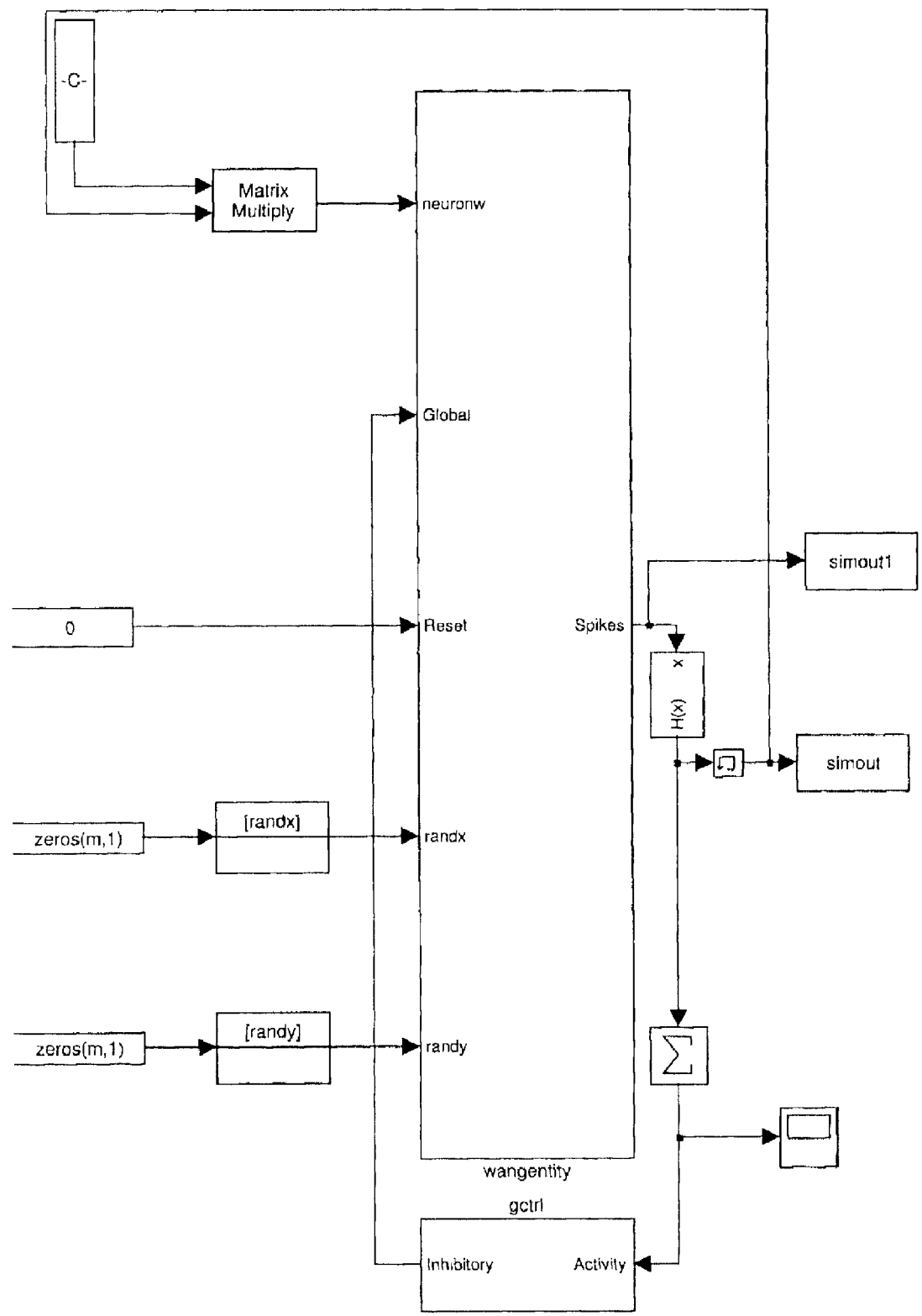
FIG. 16 is a block diagram of a RN-Spikes matrix audio oscillator model on a discrete time simulator.

Just by using ten bases, the cost function described above decreased from 1139 to 3 in 200 iterations. The original temperature of the simulated annealing was 1.0 and the final reached temperature was 0.00002. At each iteration, the system has been cooled down by an amount of 5% from the previous temperature. As seen in FIG. 15, the bases are part-based representations that characterize some fiducial points.

The following table gives the parameters used for the simulated annealing:

CoolSched=@(T)(0.95*T)
Generator=@(x)(x+(randperm(length(x))==length(x)) *randn)
InitTemp=1
MaxConsRej=1000
StopTemp=2e-8
StopVal=-Inf
MaxSuccessH=3000
MaxTriesH=20000
MaxSuccessM=2500
MaxTriesM=1000
MaxTriesL=3000
MaxSuccessL=500

Applications of Sparse NMF Coding

Applications of NMF coding comprise the following:

Fiducial point selection in facial images.

Perceptive speech coding.

Part-based image compression.

Financial data analysis.

Discrete time implementation with SIMULINK.

RN-Spikes matrix audio oscillator model on a discrete time simulator

Figure 17:
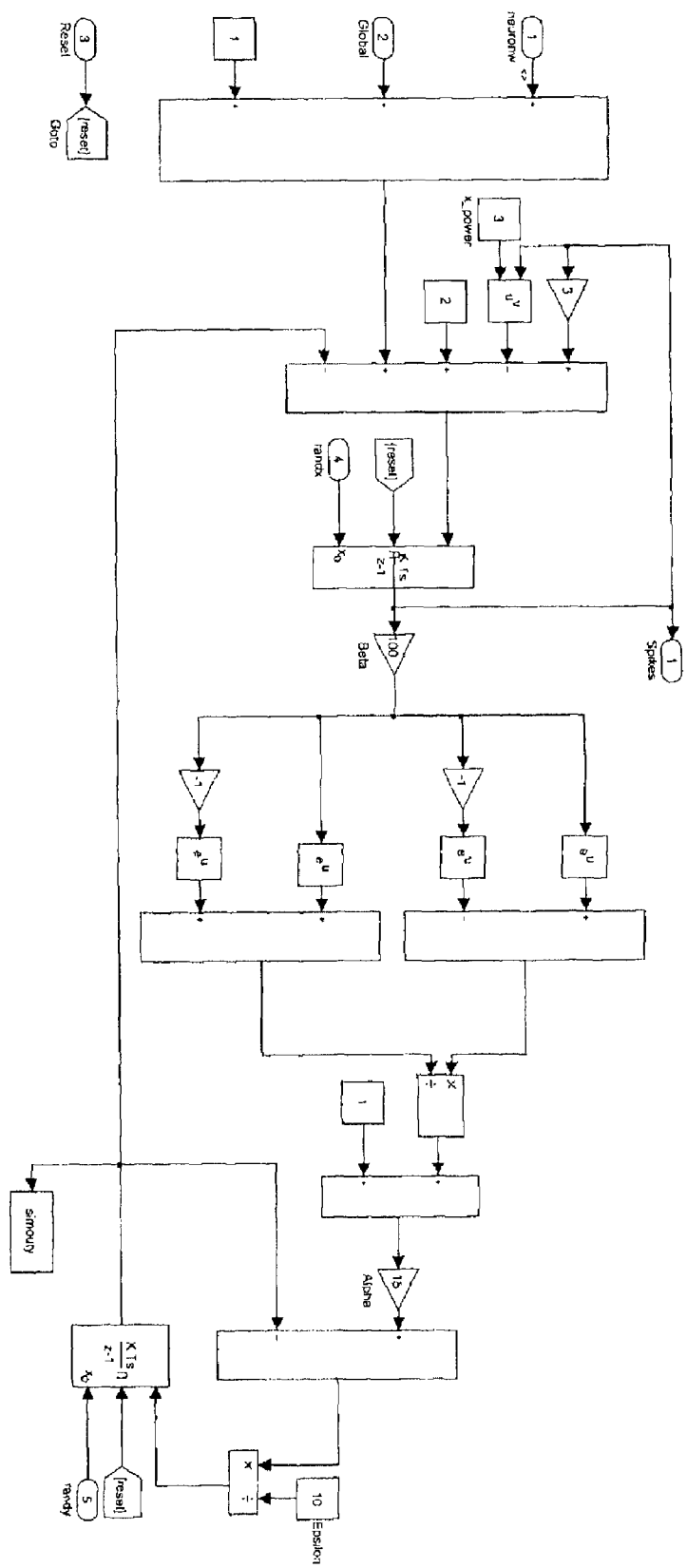
FIG. 17 is a block diagram of an oscillator model on a discrete time simulator.

A RN-Spikes model was also created specifically for an audio application (source separation). FIG. 17 illustrate a RN-Spikes matrix audio oscillator model on a discrete time simulator, and FIG. 17 shows an oscillator model on a discrete time simulator.

Neuron Block

Figure 18:
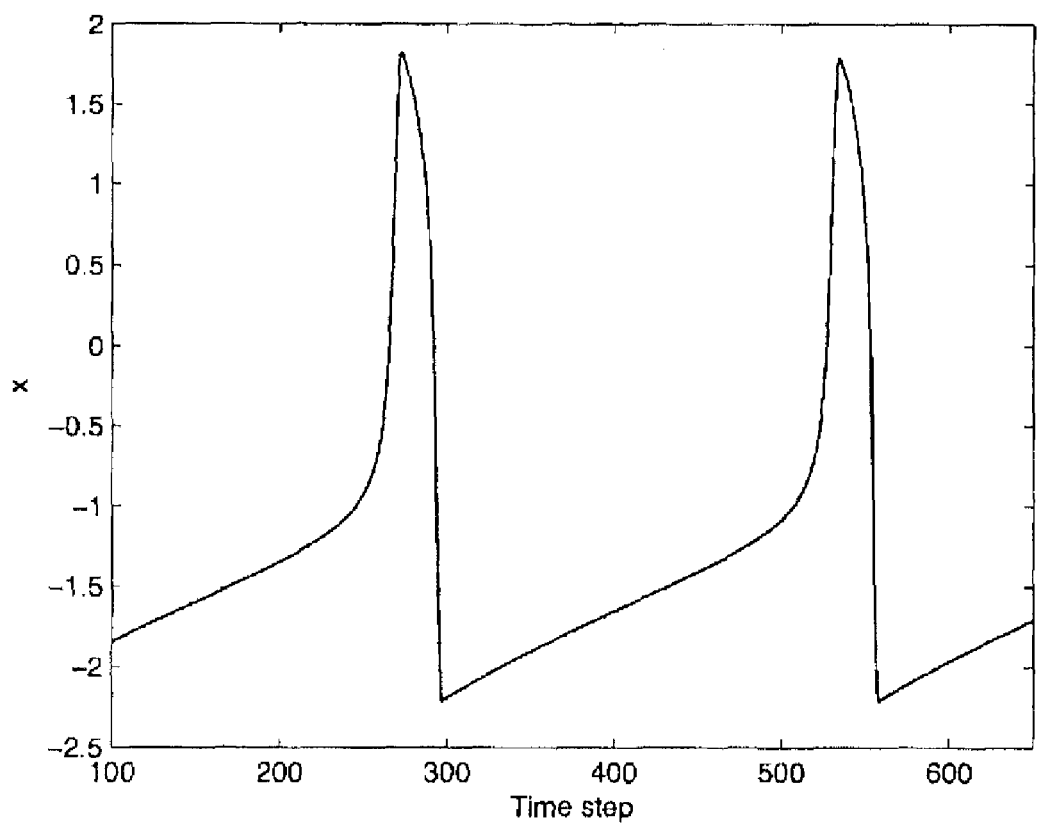
FIG. 18 is a graph showing the output x of a Terman-Wang oscillator.

The neuron block models a Terman-Wang oscillator characterized by the following equations and whose output (x) is illustrated in FIG. 18.

$$\dot{x}=f(x)-y+I \quad (24)$$

$$\dot{y}=\epsilon(g(x)-y) \quad (25)$$

$$f(x)=3x-x^3+2 \quad (26)$$

$$g(x)=\alpha(1+\tan h(x/\beta)) \quad (27)$$

However, the architecture is different. Only one layer is used and the neurons are fully connected (each neuron is connected to all neurons). It is then possible to store the connections in only one matrix. Each column of this matrix represents the connection weights of a neuron with all others (the connection for a neuron with itself is 0). As for the weights, they are computed with equation (28). These weights are constant throughout the simulation and they are determined by the difference between neuron i input value and neuron j input value (pi and pj).

$$weight = \frac{maxweight}{e^{difcoef \times |pi-pj|}} \quad (28)$$

For example, with maxweight equals to 0.2 and difcoef equals to 0.5, if neuron i input is 20 and neuron j input is 10, the connection weight would be 0.0013.

The inputs/outputs list for the network is simple and given in Table 2:

TABLE 2

| Inputs/Outputs list | |
|---|---|
| Inputs | |
| neuronw | neuron connections activated at the preceding time step |
| Global | connection to the Global Controller |
| Reset | oscillator reset value |
| randx | oscillator parameter x initial condition |
| randy | oscillator parameter y initial condition |
| Outputs | |
| Spikes | neurons output (1 if a spike is produced, else 0) |

At each time step, an output vector is generated (output Spikes that contains the presence or absence of a spike for each neuron), delayed, multiplied with the weight matrix and returned as the neurons input for the next time step (input vector neuronw).

As an example, with the following neuron input values 20, 10, 10, 10, 20 and 10, the computed weight matrix would be:

TABLE 3

Example of weight matrix for six neurons with the input values [20 10 10 10 20 10]

| 0 | 0.0013 | 0.0013 | 0.0013 | 0.2 | 0.0013 |
|---|---|---|---|---|---|
| 0.0013 | 0 | 0.2 | 0.2 | 0.0013 | 0.2 |
| 0.0013 | 0.2 | 0 | 0.2 | 0.0013 | 0.2 |
| 0.0013 | 0.2 | 0.2 | 0 | 0.0013 | 0.2 |
| 0.2 | 0.0013 | 0.0013 | 0.0013 | 0 | 0.0013 |
| 0.0013 | 0.2 | 0.2 | 0.2 | 0.0013 | 0 |

Furthermore, a normalization is applied to the weight matrix. We divide each column by the number of weights greater than a defined value in this column plus 1 (to avoid a division by zero produced by the diagonal alone).

Model Instructions

To simulate the RN-Spikes audio model with the Wang and Terman neurons:
  Define the simulation and the network parameters.
  Input value of each neuron (one filterbank channel coefficient or FFT coefficient or other chosen representations for each neuron).
  Number of neurons. Usually, we use one neuron per filterbank channel, FFT coefficient, . . .
  Parameters to calculate the static weights (maxweight and difcoef of equation 5).
  Simulation time step
  Neuron parameters ($\alpha$, $\alpha$ and [epsilon] for the oscillator model, external excitation (iext), threshold value (nthreshold) and reset value (nresetvalue) for the IaF model)
  Global Controller parameters (k and $\alpha$)
  Random initial conditions for each layer (randx and randy)
  Calculate the weights matrix using equation 5
  Run the simulation using a discrete fixed-step time solver method.

RN-Spikes Matrix Audio IaF Model on a Discrete Time Simulator

Figure 19:
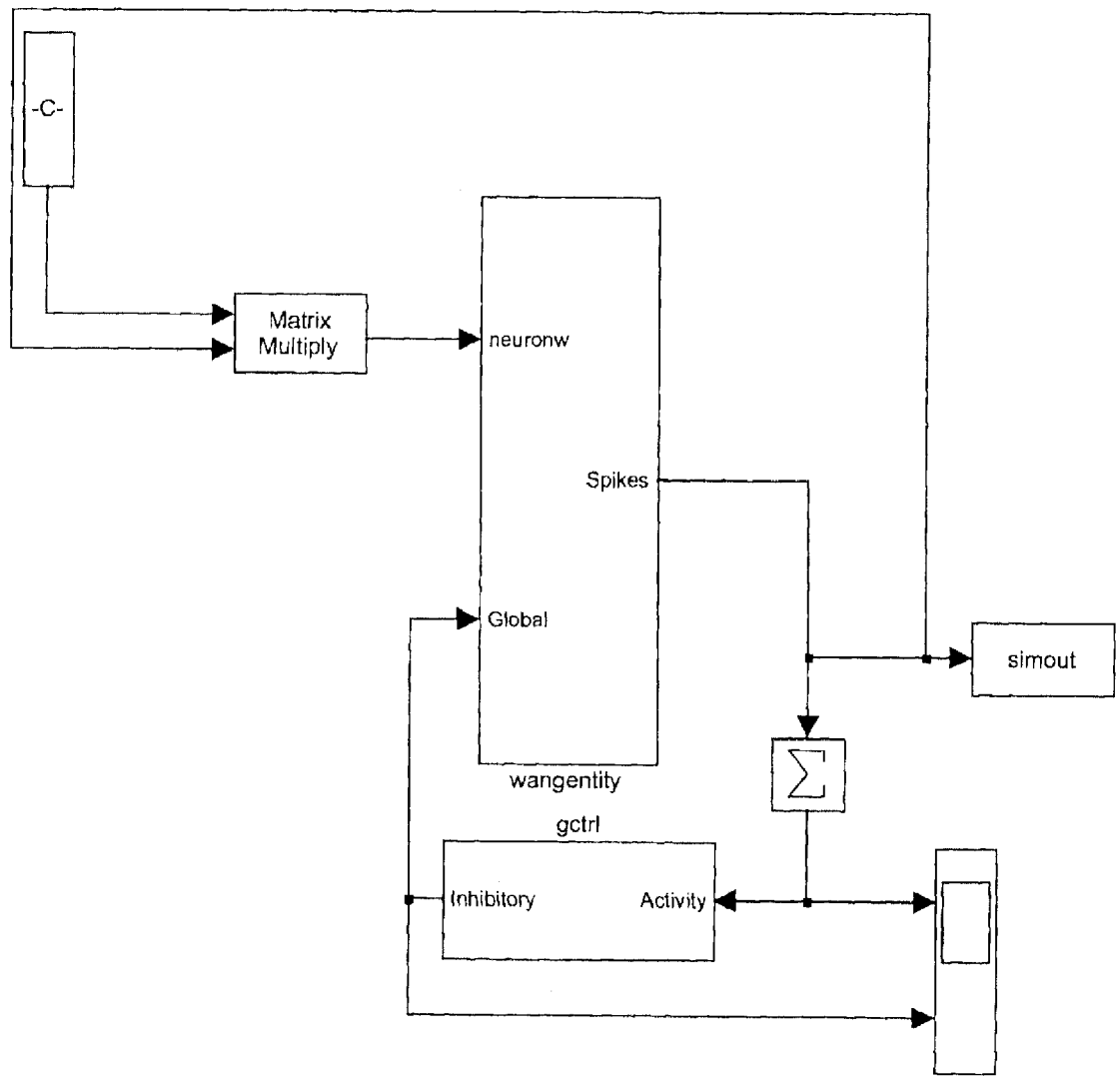
FIG. 19 is a block diagram of a RN-Spikes matrix audio IaF model on a discrete time simulator.
Figure 20:
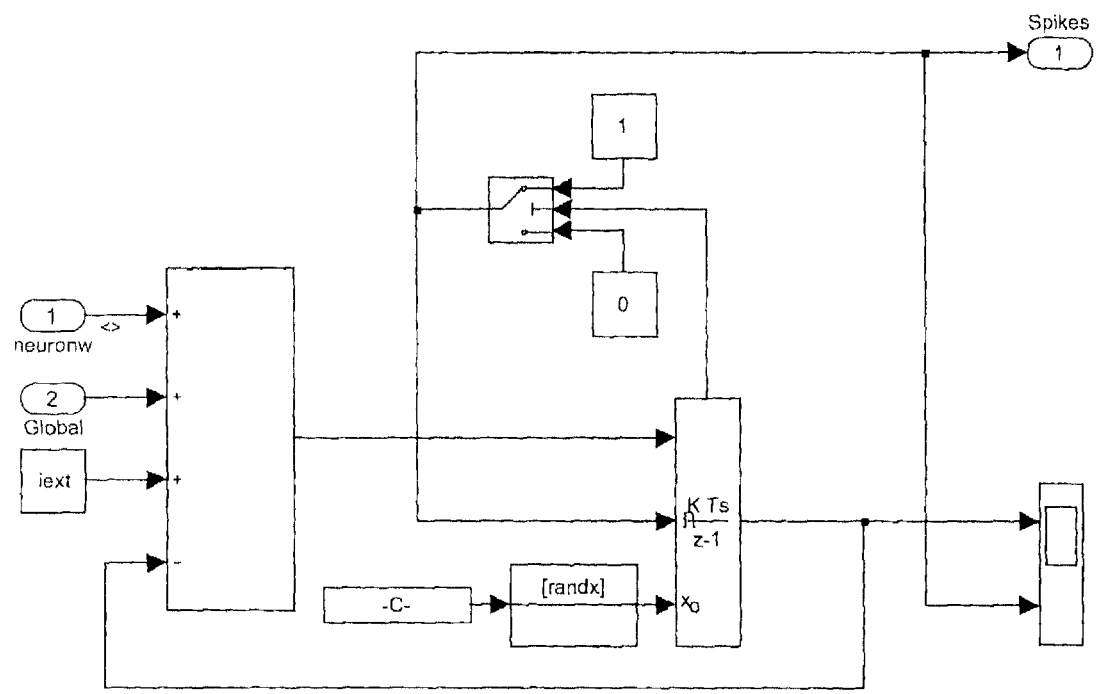
FIG. 20 is an IaF model on a discrete time simulator.

An integrate and fire (IaF) RN-Spikes audio model has also been created. Only the neuron model block has been replaced. FIG. 19 illustrates a RN-Spikes matrix audio IaF model on a discrete time simulator while FIG. 20 illustrates an IaF model on a discrete time simulator.

The IaF inputs/outputs list is given in Table 4:

TABLE 4

| Inputs/Outputs list | |
|---|---|
| Inputs | |
| neuronw | neuron connections activated at the preceding time step |
| Global | connection to the Global Controller |
| randx | neuron initial condition |
| Outputs | |
| Spikes | neurons output (1 if a spike is produced, else 0) |

The neuron block breaks down to an adder and a Discrete-Time Integrator. At each time step, the block adds the signals from its neighbors (neuronw), the effect of the Global Controller (Global) and a constant that defines the spiking frequency (iext). It also subtracts the value computed by the Discrete-Time Integrator.

Figure 21:
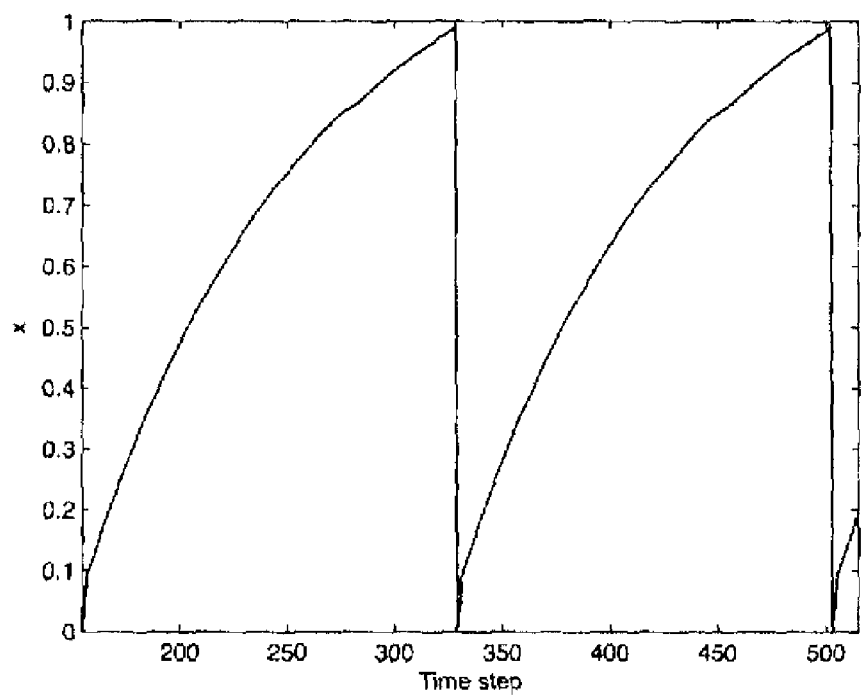
FIG. 21 is a graph showing the output x of an IaF model.

If the sum crosses the threshold, a spike is generated (the output equals 1 for one time step) and the sum is put to zero (through a feedback loop connected to the Discrete-Time Integrator Reset). FIG. 21 shows the IaF model's output (x).

Event driven Implementation in C/C++

Figure 22:
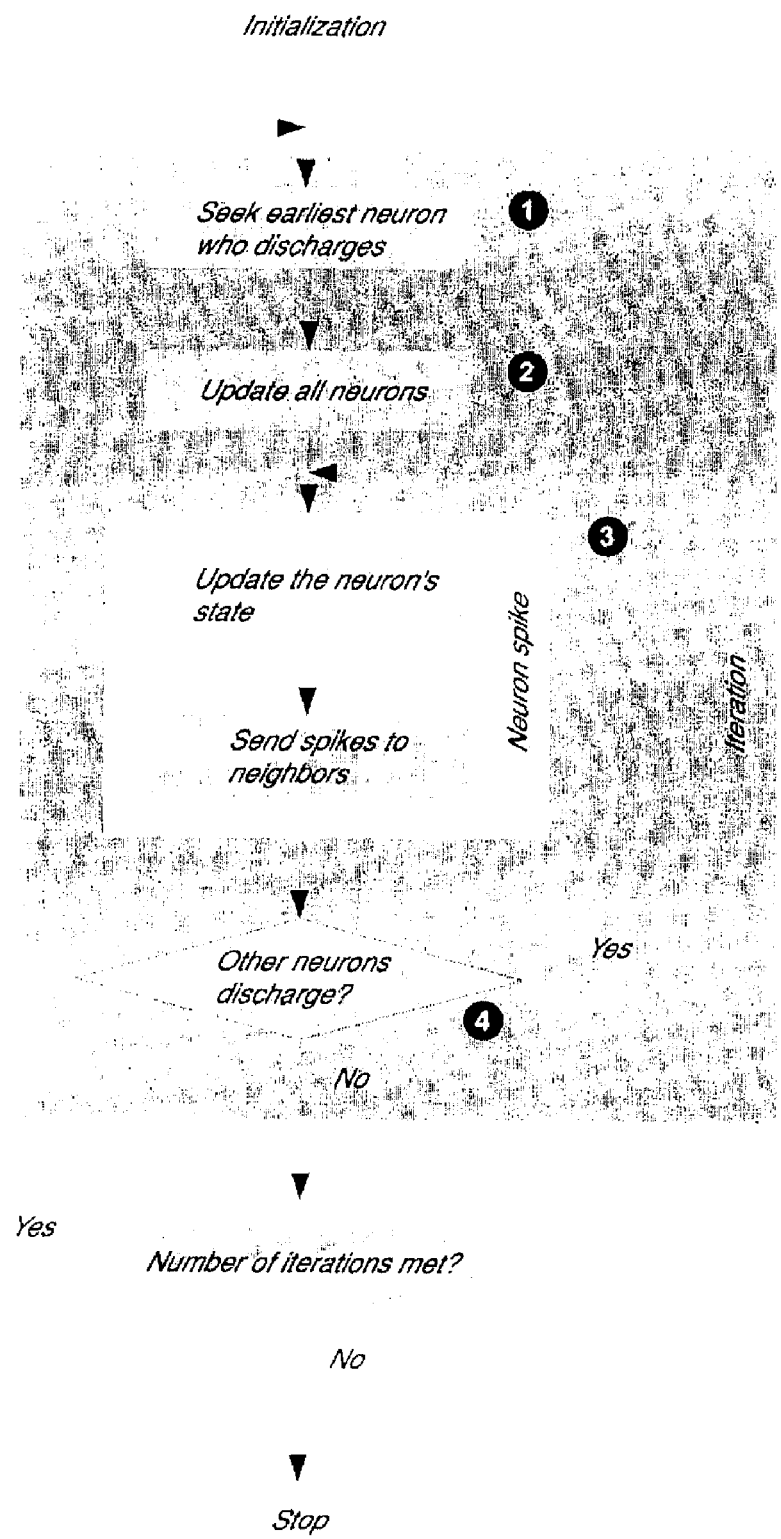
FIG. 22 is a flow chart of the operations in an event driven model.
Figure 23:
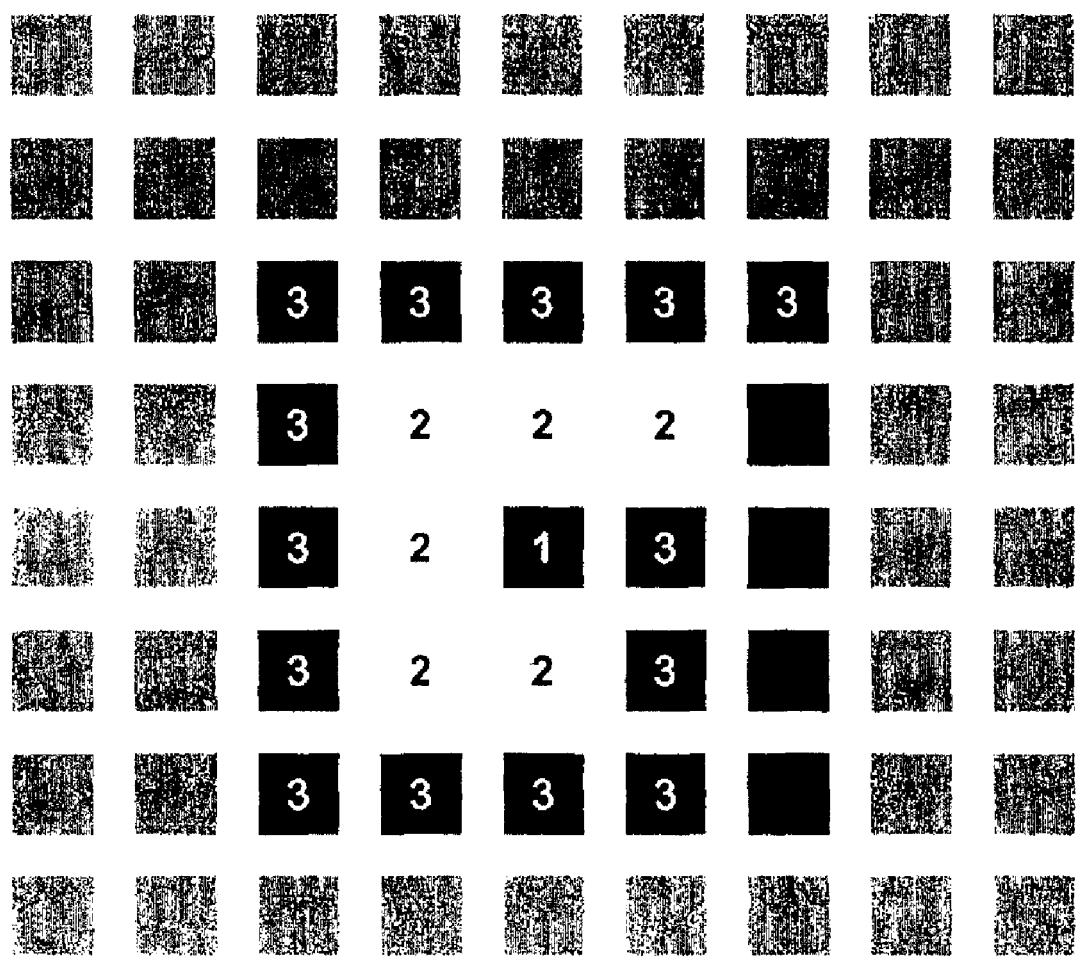
FIG. 23 is a schematic diagram showing spike propagation.

FIG. 22 represent an event driven model. Following the event driven approach, at each iteration, the goal is to find the instant where the state changes and to update the model at this instant. The algorithm can be represented by a BFS (Breadth First Search). During an iteration (FIG. 23), the earliest neuron to fire is named 1. Neurons around neuron 1, should then fire because of neuron's 1 spike (designed as neurons 2). Then neurons 2's neighbors receive in turn a spike which can lead them to fire (neurons 3). The iteration ends when no more neuron have their potential exceeding the threshold.

Referring back to FIG. 22, during an iteration, step 4 is useful to optimize the performance. Indeed, through the simulation an exhaustive search is performed on the entire layer (or network) to find the neurons ready to fire. However, a local search limited to the immediate neighborhood of the first neuron to discharge could be done. This strategy is interesting if we use conventional serial computers. On the other hand, limited gain is offered for a hardware implementation.

Network Implementations

This section presents various strategies to enhance the neural network features and ease the implementation for real time integration.

Initialization

The system has two modes of initialization which can be chosen by the user. The first mode consists in randomly setting the internal potentials of each neuron independently of the inputs. A second mode consists in setting up the initial internal potentials in relation to the inputs. The inputs can be any signals. We illustrate here one implementation of the second mode in the context of images, the procedure can be used with anything else.

Since connection weights rely mainly on input (pixel) values, we opted for a normalization of input (pixel) values from the range 0-255 to 0-1. Indeed, each grey level is attributed a corresponding initial potential NeuronInitPotential:

$$NeuronInitPotential = \frac{InputValue * FireTime * \alpha}{inputRange} \quad (29)$$

where inputRange is the range of the input values. Depending on the application in hand FireTime is a constant (equals to 1) or the estimated instant of discharge of the neuron. $\alpha$ is constant (smaller than 1) and constraints the initial neuron potential to be less than 1.

For example, in the context of face recognition we have $$NeuronInitPotential = \frac{PixelValue * 1 * 0.9}{256} \quad (30)$$

This modification helps the segmentation phase of ODLM, diminishing the quantity of segmentation's iterations needed before stabilization. It also gives us the flexibility to use any image for neurons' potentials initialization.

Gestion of the Normalization

It is possible to modify the behavior of the neural network with different strategies in the normalization of weights and contributions of neurons. In this section we illustrate some of them based on the following equations.

$$S_{i,j}(t) = \sum_{k,m \in N^{ext}(i,j)} \{w^{ext}_{i,j,k,m}(t) H(x^{ext}(k,m;t))\} + \quad (31)$$

$$\sum_{k,m \in N^{int}(i,j)} \{w^{int}_{i,j,k,m}(t) H(x^{int}(k,m;t))\} - \eta G(t)$$

$$w^{ext}_{i,j,k,m}(t) = \frac{w^{ext}_{max}(t)}{Card\{N^{ext}(i,j) \cup N^{int}(i,j)\}(t)} \cdot \frac{f(i,j,k,m;t)}{e^{\lambda|p(i,j;t) - p(k,m;t)|}} \quad (32)$$

$$\frac{w^{ext}_{max}(t)}{Card\{N^{ext}(i,j) \cup N^{int}(i,j)\}(t)} \quad (33)$$

The normalization of contributions when there are discharges plays a crucial role in the synchronization of neurons. For example, when it is necessary to guaranty a constant period of discharges (especially when using simplified models of spiking neurons—like the integrate and fire model) the weights in the networks have to be normalized. That is, each neuron needs to receive the same sum of activities for a given iteration, or there could arise unwanted frequencies distinctions between regions.

Two solutions are presented and compared here. The first strategy does a local normalization while the second strategy takes into consideration all activities.

Example of implementation for a network with different firing periods after stabilization Otherwise, bypass 'send weights to neighbors' and go to next neuron without sending contributions. Next, if all neurons of the image were verified, an indicator tells if there were any discharges. If not, the iteration is completed, otherwise go back to the first neuron and starts all over the verification process for all neurons of the image.

Figure 24:
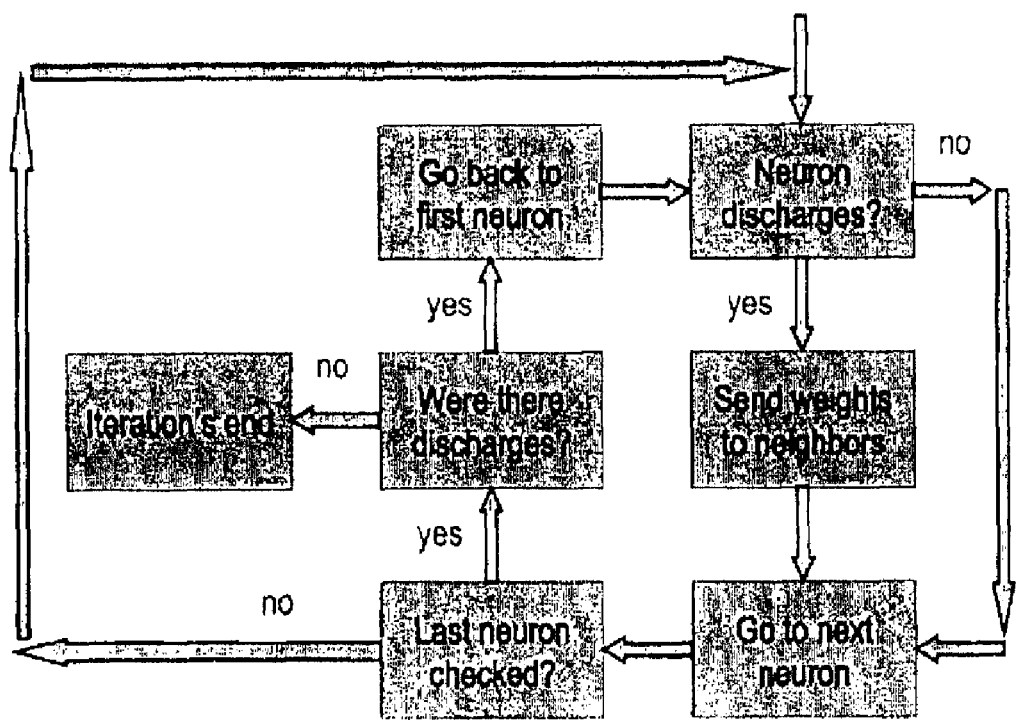
FIG. 24 is a flow chart illustrating an example of normalized weigthing yielding a non stable frequency in the network, comprising verification if the discharge threshold is exceeded and, if exceeded, sending contributions to all neighbors and then go to the next neuron.

FIG. 24 represents the flow of information for one type of implementation.

Figure 25:
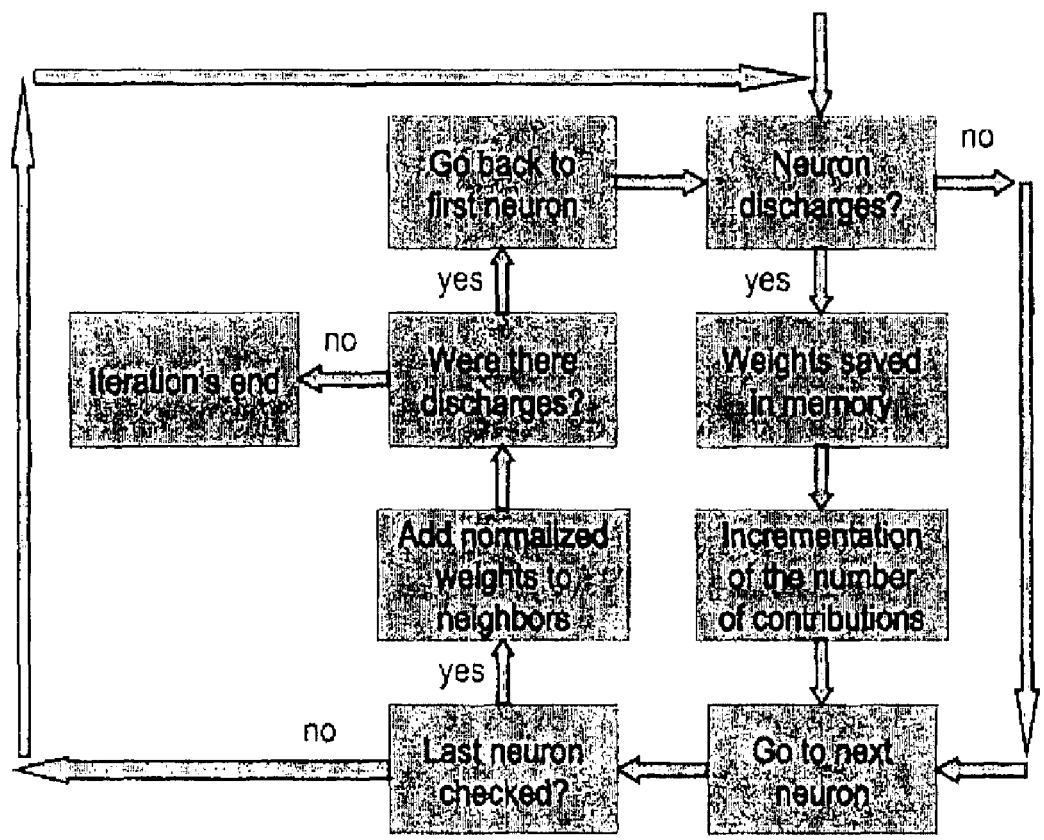
FIG. 25 is a flow chart illustrating an example of normalized weigthing yielding a constant frequency after stabilization of the neural network, starting with verifying if the discharge threshold is exceeded, but wherein contributions to neighbors is not distributed but stocked in memory and the number of contributions on these neighbors is incremented, and wherein the contributions are sent only when all neurons have been verified and after they have been normalized.
Figure 26:
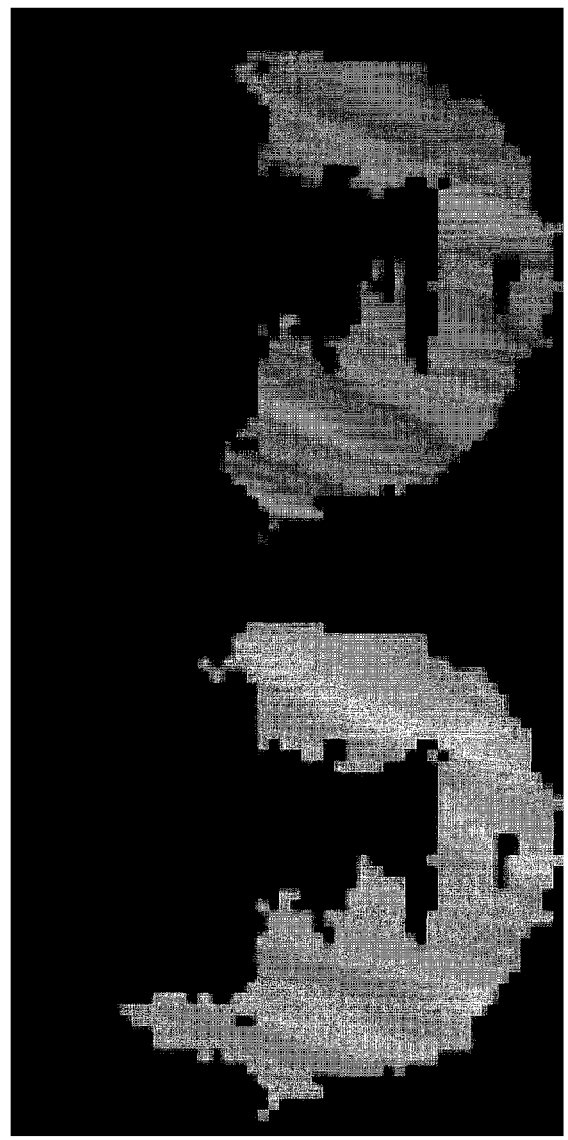
FIG. 26 is an example of two segments considered as identical, wherein these segments are obtained after presentation of face Face00013_b to both layers of neurons after a segmentation phase.

Examples of an Implementation Yielding a Common Firing Frequency after Stabilization The second strategy is summarized in equation 34 and in FIG. 25.

$$Potential = Potential + \frac{ContributionsSum}{NumberOfContributions} \quad (34)$$

Potential is the sum of the current potential with the normalized contributions. These normalized contributions correspond to the term $S_{i,j}(t)$ of equation 31.

ContributionsSum is the full sum of all contributions a given neuron receives from other discharging neurons during the discharge checking process of all neurons—that is at the time corresponding to stage Last neuron checked? with a positive answer (yes). ContributionsSum corresponds to the term $w_{i,j,k,m}$ .. (t) of equation 31. The NumberOfContributions is the number of neurons who contribute to ContributionSum—that is the number of discharging neurons who give some potential to the considered neuron. It corresponds to the term Card of equation 32.

$$Weight_{ij} = \frac{MaxWeight_i}{PossibleNumberOfNeighbors_i} * \exp(-\alpha * Distance_{ij}) \quad (35)$$

$$Weight_{ij} = MaxWeight_i * \exp(-\alpha * Distance_{ij}) \quad (36)$$

Where $$\frac{1}{\exp(-\alpha * Distance_{ij})}$$

corresponds to the term $e^{\lambda|p(i,j;t) - p(k,m;t)|}$ of equation 32 and MaxWeight$_i$ to the term $w_{max}$ .. (t) of equation 32. PossibleNumberOfNeighbors$_i$ is a static normalization, hence Weight$_{ij}$ is a static value for each neuron in the context of static images. We define ActiveNeighbors as the dynamic state of the equation 33.

The global coupling $$\left(ActiveNeighbors*S(t)*\frac{MaxWeight}{PossibleNumberOfNeighbors*ActiveNeighbors}\right)$$

with equation 35 is not constant yielding a change in the oscillation frequencies. However, if we remove the normalization based on the number of possible neighbors, the global coupling $$\left(ActiveNeighbors*S(t)*\frac{MaxWeight}{ActiveNeighbors}\right)$$

is constant.

Speeding-Up the Neuronal Potential Computation

When the current i in the neuron (from one iteration to another one) can be assumed to be constant (or almost constant), it is possible to increase the speed of the system.

On each simulation events, we need to evaluate time before spiking and actual internal potential of neurons. Depending on the model in use, several translations between time and potential occurs requesting many evaluations of equations. However, in many scenarios, both parameters are related or function of the other. It is then possible to only keep one value in memory and only proceed with translation when required. For performance reasons, one should keep the parameter involved in most of processing inside the simulation.

In our model, we define u as the internal potential of a neuron, t the time before the next spiking and delta the delay between actual and the next spiking (delta is also the increment of time for the next iteration). u and t are related as shown by the following equations:

$$u = i - ie^{-t} \quad (37)$$

$$t = \ln\left[\frac{i}{i-u}\right] \quad (38)$$

As both translations require logarithm and exponential, and one iteration can request thousands, processing time is greatly improved if we can eliminate some. u is used to accumulate contributions from connected neurons. During an iteration, each spiking neuron generates potential and all connected neurons add this potential to its internal. This parameter if frequently used during iteration.

The t parameter is generally used to find the next firing neuron by scanning each one to find the smallest t or preferably delta. As per the equation (37) finding the smallest t is the same as finding the greatest u. With this u, we can evaluate "delta" for the next iteration (time step) using equation (38).

To be able to use only u for all operations of ODLM, one need to express all internal equations using only u and delta. Equation (39) shows the next potential (u) of a neuron after the delay of one iteration (after delta). Developing this equation using equation (38), one get equation (40) which expresses the internal potential of a neuron after elapsed time.

$$u' = i - ie^{-(t+\Delta)} \quad (39)$$

$$u' = i - (i-u)e^{-\Delta} \quad (40)$$

Some differences were noted on some simulations when number of iterations is small (less then 500), but with larger simulations, results are identical. These differences may be due to quantizations during multiple translations between t and u not present in the optimized version.

Finally, an other optimization is possible from equation (40). Since delta is constant for one iteration, $e^{-delta}$ is also constant, meaning that we only have one exponential by cycle. Simulation results showed 50% improvement in processing time for the same files provided as input.

Adding segmentation's effects in matching stage: labelling each segment with an averaged color It is possible to adapt the segmentation so that it has a greater contribution to the matching and increases the power of the neural network.

A process is being added to evaluate and associate an average of pixel's color to each candidate segment (or region). Connection weights between layers are modified to take into consideration the averaged segment color.

Description of the Algorithm

```
ExtraWeightsForLayer[(r1 * col) + c1][(r2 * col) + c2] = connect_weight
(wmax_extra,(
fabs(valeurPixel(matrix[r1][c1].region, /* reference to the region
of this pixel */
n,        /* number of different regions on both layers */
hist,     /* histogram (table)of number of pixels by region */
val,      /* index of regionID(table) */
MeanPixel)          /* sum of pixel values(table) by region */
valeurPixel(matrixOther[r2][c2].region, /* reference to the region
of the connected */
/* neuron on the other layer */
n,        /* number of different regions on both layers */
hist,     /* histogram (table)of number of pixels by region */
val,      /* index of regionID(table) */
MeanPixel)          /* sum of pixel values(table) by region */
) * _contrib_seg +  /* Contribution factor of segmentation average */
/* value comme from simulation parameters */
fabs(matrix[r1][c1].pixel – matrixOther[r2][c2].pixel) *
(1 – _contrib_seg)),
/* contribution from pixel's value differences */
/* from connected neurons */
matrix[r1][c1].neighbour_match, /* number of connections to this
neuron */
alpha_extra);       /* alpha for extra layer connection */
```

First, "connect_weight" performs the calculation of the coefficient, or weight, to be used for the considered connection. This function has 4 parameters: weight max, pixel values differences, number of connections for the originating neuron, alpha constant for extra layer.

The second function "valeurPixel" only finds the neuron's regions and return the averaged colors for this region.

Altering extra layer connection weights using $P^2/S$ ratios for the matching stage.

It is assumed here that the segmentation has been completed and we alter the weights $W_{i,j,k,m}^{ext}(t)$ between neurons (i,j) from one layer and neurons (k,m) from another layer. During matching, this alteration forces the system to take into account the shape of the segments.

Let us define $P_{i,j}$ as being the perimeter of the segment associated to neuron (i,j) and $P_{k,m}$ the perimeter associated to the segment of neuron (k,m).

Let us define $S_{i,j}$ as being the surface of the segment associated to neuron (i,j) and $S_{k,m}$ the surface associated to the segment of neuron (k,m).

A ratio parameter $$\frac{P_{i,j}^2}{S_{i,j}}$$

that characterizes the shape of the segment associated to neuron (i,j) is derived. That parameter is known to be independent of translations, rotations and homotheties for a given shape. This ratio is used as a comparison factor to ease the matching between segments with similar shapes. In general when shapes are similar, these ratios tend to be equal. We recall that $$\frac{P_{i,j}^2}{S_{i,j}}$$

is independent from sizes of shapes.

In RN-Spikes, surfaces $S_{ij}$ are defined as the number of synchronous neurons with the same phase belonging to the same segment. Perimeters $P_{ij}$ are the number of neurons that have at least one neighbor on a different region (in a different segment).

There are many strategies to alter the external weights (weights between layers) $w_{i,j;k;m}^{ext}(t)$. We illustrate on two examples.

$$\frac{P_{i,j}^2}{S_{i,j}}$$

as an argument of the connection weights

Starting from equation 4:

$$w_{i,j,k,m}^{ext}(t) = \frac{w_{max}^{ext}(t)}{\text{Card }\{N^{ext}(i,j) \cup N^{int}(i,j)\}(t)} \cdot \frac{f(i,j,k,m;t)}{e^{\lambda|p(i,j;t)-p(k,m;t)|}} \quad (41)$$

One can state that:

$$f(i,j,k,m;t) \frac{1}{e^{\epsilon|R_{i,j;t}-R_{k,l;t}|}} \quad (42)$$

with $$R_{i,j;t} = \frac{P_{i,j}(t)^2}{S_{i,j}(t)} \quad (43)$$

Note that $R_{i,j;t}$ can be any other expression that characterizes the shape of a segment. By doing so and finding the suitable $\epsilon$, it is possible to guide and focus the neural network on the segment's shapes. It it important to note that another function than the exponential can be used in the expression of the function f(i,j,k,m;t).

$$\frac{P_{i,j}^2}{S_{i,j}}$$

as a weighting factor of the connection weights

This time f is a kind of discrete function that is equal to 1 or to a constant (WMAX_POND) depending on the network activity and on the segment shapes.

$$f(i,j,k,m;t) = \begin{cases} = 1 & \text{if segment shapes are not similar} \\ = \text{WMAX\_POND} & \text{if segment shapes are similar} \end{cases} \quad (44)$$

When generating the connection weights table for extra layer connections, we multiply the maximum value $W_{max}$ of $w_{i,j;k;m}^{ext}(t)$ by WMAX_POND if the shapes of the 2 segments are comparable (that is: if $$\frac{P_{i,j}^2}{S_{i,j}} \text{ and } \frac{P_{k,m}^2}{S_{k,m}}$$

are close). This is detailed below.

$$\text{If: } \frac{\left|\frac{P_{i,j}^2}{S_{i,j}} - \frac{P_{k,m}^2}{S_{k,m}}\right|}{\frac{P_{i,j}^2}{S_{i,j}}} < \text{CORR\_TEST} \quad (45)$$

Then: $W_{newmax} = \text{WMAX\_POND} \cdot W_{max}$

CORR_TEST is a constant. Both CORR_TEST and WMAX_POND are parameters to be provided to the network. It is also possible to recursively adapt CORR_TEST and WMAX_POND depending on the convergence of the network.

To prevent small surfaces (like isolated neurons) to influence the results, we only implement this modification for regions presenting more than 0.5% of the image (this value can be modified depending on the application in hand).

Although the present invention has been disclosed in the foregoing non-restrictive description in relation to illustrative embodiments thereof, these embodiments can be modified at will within the scope of the appended claims without departing from the spirit and nature of the subject invention.

References

[1] B1 Immerseel, L. V. *Een functioneel gehoormodel voor de analyse van spraak bj spraakherkenning*. Ph.D, 05 1993.

[2] B2 Karlsen, B. L., Brown, G. J., Cooke, M., Crawford, M., Green, P., Renals, S. *Analysis of a Multi-Simultaneous-Speaker Corpus*. L. Erlbaum, 1998.

[3] B3 Pichevar, R. *Speech Processing in the Presence of "Cocktail Party" Effect and its Applications in Information Technology*. PhD thesis, University of Sherbrooke (to appear), 2004.

[4] B4 Berthommier, F., Meyer, G., 1997. *Improving of amplitude modulation maps for f0-dependent segregation of harmonic sounds*. Eurospeech '97, 1997.

[5] B5 Valin, J.-M., Rouat, J., Michaud, F. *Microphone array post-filter for separation of simultaneous non-stationary sources*. IEEE Int. Conf. on Acoustics Speech Signal Processing. Accepted 2004.

[6] B6 Vinh Ho, T. and Rouat, J. *Novelty detection based on relaxation time of a network of integrate-and-fire neurons*. In IEEE Int'l Joint Conference on Neural Networks, Alaska, USA, 1998.

[7] B7 Widrow, B., al. *Adaptive noise cancelling: Principles and applications*. Proceedings of the IEEE 63 (12), 1975.

[8] B8 Wiskott, L. and Sejnowski, T. *Slow feature analysis: Unsupervised learning of invariances*. Neural Computation, 2002, pp. pages 715-770, 2002.

[9] Maass, W. *Networks of spiking neurons: The third generation of neural network models*. Neural Networks 10 (9), 1997, p.p. 1659-1671.

[10] B10 Ezzaidi, H. and Rouat, J. *Pitch and MFCC dependent GMM models for speaker identification systems*. In IEEE CCECE, accepted 2004.

[11] B11 Ellis, D. *Prediction-driven computational auditory scene analysis*. Ph.D. thesis, MIT, 1996.

[12] B12 Cooke, M. *Modelling auditory processing and organisation*. Ph.D. thesis, University of Sheffield, 1991.

[13] B13 Meyer, G., Yang, D., Ainsworth, W. *Applying a model of concurrent vowel segregation to real speech*. Computational models of auditory function, 2001, pp. 297-310.

[14] B14 Pichevar, R. and Rouat, J. *Cochleotopic/AMtopic (CAM) and Cochleotopic/Spectrotopic (CSM) map based sound source separation using relaxation oscillatory neurons*. IEEE Neural Networks for Signal Processing Workshop, Toulouse, France, 2003.

[15] B15 Todd, N. *An auditory cortical theory of auditory stream segregation*. Network Computation in Neural Systems. 7, 1999, pp. 349-356.

[16] B16 Kaneda, Y., Ohga, J. *Adaptive microphone-array system for noise reduction*. TrASSP 34 (6), 1986, pp. 1391-1400.

[17] B17 Frisina, R. D., Smith, R. L., Chamberlain, S. C., 1985. *Differential encoding of rapid changes in sound amplitude by second-order auditory neurons*. Experimental Brain Research 60, 1985, pp. 417-422.

[18] B18 Hu, G., Wang, D. *Monaural speech segregation based on pitch tracking and amplitude modulation*. Tech. rep., Ohio State University, 2002.

[19] B19 Wang, D., Brown, G. J. *Separation of speech from interfering sounds based on oscillatory correlation*. IEEE Transactions on Neural Networks 10 (3), May 1999, pp. 684-697.

[20] B20 Levy, N., Horn, D., Meilijson, I., Ruppin, E. *Distributed synchrony in a cell assembly of spiking neurons*. Neural Networks. 14 (6-7), 7 2001, pp. 815-824.

[21] B21 Roweis, S. *Factorial models and refiltering for speech separation and denoising*. Eurospeech 2003.

[22] B22 Reyes-Gomez, M. J., Raj, B., Ellis, D. *Multi-channel source separation by factorial HMMs*. ICASSP 2003.

[23] B23 Harding, S., Meyer, G. *Multi-resolution auditory scene analysis: Robust speech recognition using pattern-matching from a noisy signal*. EUROSPEECH., September 2003, pp. 2109-2112.

[24] B24 Irino, T., Patterson, R. *Speech segregation using event synchronous auditory vocoder*. ICASSP. Vol. V, 2003, pp. 525-528.

[25] B25 Nix, J., Kleinschmidt, M., Hohmann, V. *Computational auditory scene analysis by using statistics of high-dimensional speech dynamics and sound source direction*. EUROSPEECH, September 2003, pp. 1441-1444.

[26] B26 Tang, P., Rouat, J. *Modeling neurons in the anteroventral cochlear nucleus for amplitude modulation (AM) processing: Application to speech sound*. Proc. Int. Conf. on Spok. Lang. Proc. p. Th.P.2S2.2, October 1996.

[27] B27 Thorpe, S., Delorme, A., Rullen, R. V. *Spike-based strategies for rapid processing*. Neural Networks 14 (6-7), 2001, pp. 715-725.

[28] B28 Delgutte, B. *Representation of speech-like sounds in the discharge patterns of auditory nerve fibers*. JASA 68, 1980, pp. 843-857.

[29] B29 Hewitt, M., Meddis, R. *A computer model of amplitude-modulation sensitivity of single units in the inferior colliculus*. Journal of the Acoustical Society of America 95 (4), 04 1994, pp. 2145-2159.

[30] B30 Zotkin, D. N., Shamma, S. A., Ru, P., Duraiswami, R., Davis, L. S. *Pitch and timbre manipulations using cortical representation of sound*. ICASSP. Vol. V. 2003, pp. 517-520.

[31] B31 Thorpe, S., Fize, D., Marlot, C. *Speed of processing in the human visual system*. Nature 381 (6582), 1996, pp. 520-522.

[32] B32 Maass, W., Sontag, E. D., aug 2000. *Neural systems as nonlinear filters*. Neural Computation 12 (8), August 2000, pp. 1743-1772.

[33] B33 Natschlager, T., Maass, W., Zador, A. *Efficient temporal processing with biologically realistic dynamic synapses*. Network: Computation in Neural Systems 12 (1), 2001, pp. 75-87.

[34] B34 Chechik, G., Tishby, N. *Temporally dependent plasticity: An information theoretic account*. NIPS, 2000.

[35] B35 DeWeese, M. *Optimization principles for the neural code*. Network: Computation in Neural Systems 7 (2), 1996, pp. 325-331.

[36] B36 Rieke, F., Warland, D., de Ruyter van Steveninck, R., Bialek, W. *SPIKES Exploring the Neural Code*. MIT Press, 1997.

[37] B37 Ho, T. V., Rouat, J. *Novelty detection based on relaxation time of a network of integrate-and-fire neurons*. Proc. of the IEEE, INNS Int. Joint Conf. on Neural Networks. Vol. 2, May 1998, pp. 1524-1529.

[38] B38 Milner, P. *A model for visual shape recognition*. Psychological Review 81, 1974, pp. 521-535.

[39] B39 Von der Malsburg, C. *The correlation theory of brain function*. Tech. Rep. Internal Report 81-2, Max-Planck Institute for Biophysical Chemistry, 1981.

[40] B40 Von der Malsburg, C., Schneider, W. *A neural cocktail-party processor*. Biol. Cybern., 1986, pp. 29-40.

[41] B41 Bohte, S. M., Poutre, H. L., Kok, J. N., March 2002. *Unsupervised clustering with spiking neurons by sparse temporal coding and multilayer rbf networks*. IEEE transactions on neural networks 13 (2), March 2002, pp. 426-435.

[42] B42 Schwartz, J. L., Escudier, P. *Auditory processing in a post-cochlear neural network: Vowel spectrum processing based on spike synchrony*. EUROSPEECH, 1989, pp. 247-253.

[43] B43 Hopfield, J. *Pattern recognition computation using action potential timing for stimulus representation*. Nature 376, 1995, pp. 33-36.

[44] B44 Kubin, G., Kleijn, W. B. *On speech coding in a perceptual domain*. ICASSP. Vol. 1. Phoenix, Ariz., March 1999, pp. 205-208.

[45] B45 Wang, D., Terman, D. *Image segmentation based on oscillatory correlation*. Neural Computation 9, 1997, pp. 805-836.

[46] B46 Konen, W., Maurer, T. and Von der Malsburg, C. *A fast dynamic link matching algorithm for invariant pattern recognition*. Neural Networks, 1994, pp. 1019-1030.

[47] B47 Postma, E. O., Van der Herik, H. J. and Hudson. P. T. W. *SCAN: A scalable neural model of covert attention*. Neural Networks, 1997, 10:993-1015, 1997.

[48] B48 Fukushima, K. *A neural network model for selective attention in visual pattern recognition*. Biol. Cybernetics, 1986, pp. pages 5-15, 1986.

[49] B49 Cooke, M., 2004. http://www.dcs.shef.ac.uk/~martin/.

[50] B50 Mellinger, K. *Event formation and separation in musical sound*. Ph.D. thesis, Stanford University, 1991.

[51] B51 Sameti, H., Sheikhzadeh, H., Deng, L., Brennan, R., 1998. *HMM based strategies for enhancement of speech signals embedded in nonstationary noise.* IEEE Trans. on Speech and Audio Processing, 1998, pp. 445-455.

[A0] M. Abeles. Corticonix, Neural Circuits of the Cerebral Cortex. Cambridge University Press, 1991.

[A2] DeLiang Wang. The Time Dimension for Scene Analysis. *IEEE Trans. on Neural Networks,* 2005. in press.

[A3] Michael Schmitt. http://www.ruhr-uni-bochum.de/lmi/mschmitt/.

[A4] Wolfgang Maass. http://www.igi.tugraz.at/maass/publications.html.

[A5] *Handbook of Neural Computation.* IOP Publishing Ltd and Oxford University Press, 1997.

[A6] W. Maass and C. M. Bishop. *Pulsed Neural Networks.* MIT Press, 1998.

[A7] Ramin Pichevar, Jean Rouat, and Tan Tanh Tai Le. The oscillatory dynamic link matcher for spiking-neuron-based pattern recognition. *Neurocomputing (Elsevier),* 2006. in Press.

[8] 1 B. Olshausen and D. Field. Sparse coding with an overcomplete basis set: A strategy employed by v1? *Vision Research,* pages 3311-3325, 1997.

[9] 2 E. Smith and M. Lewicki. Efficient coding of time-relative structure using spikes. *Neural Computation,* pages 19-45, 2003.

[10] 3M. Lewicki and T. Sejnowski. Learning overcomplete representations. *Neural Computation,* pages 337-365, 2000.

[11] 4 D. D. Lee and S. H. Seung. Learning the parts of objects by non-negative matrix factorization. *Nature,* pages 788-791, 1999.

[12] 5 D. D. Lee and S. H. Seung. Non-negative matrix factorization with sparseness constraints. *Journal of Machine Learning Research,* pages 1457-1469, 2004.

[13] 6 L. Wiskott and T. Sejnowski. Slow feature analysis: Unsupervised learning of invariances. *Neural Computation, pages* 715-770, 2002.

[14] 7 E. P. Simoncelli, W. T. Freeman, E. H. Adelson, and D. J. Heeger. Shiftable multi-scale transforms. *IEEE Trans Information Theory,* pages 587-607, 1992.

[15] 8 E. J. Haug and J. S. Arora. *Applied Optimal Design.* 1979.

[16] 9 S. Z. Li, X. W. Hou, H. J. Zhang, and Q. Cheng. Learning spatially localized, parts-based representation. In *IEEE Computer Vision and Pattern Recognition,* 2001.

[17] 10 S. Abdallah and M. Plumbley. Unsupervised analysis of polyphonic music using sparse coding. *IEEE Trans Neural Networks,* pages 179-196, 2006.

[18] 11 B. Willmore and D. J. Tolhurst. Characterizing the sparseness of neural codes. *Network: Computation in Neural Systems,* pages 255-270, 2001.

[19] 12 C. C. Aggarwal, A. Hinnenburg, and D. A. Keim. On the surprising behavior of distance metrics in high dimensional space. *Lecture Notes in Computer Science,*

[20] 83 S. R. Campbell, D. L. Wang, and C. Jayaprakash. Synchrony and desynchrony in integrate-and-fire oscillators. *Neural Comput,* 11(7):1595-1619, 1999.

[21] 84 Hyup J. Cho and Young K. Cho. Devs-c++ reference guide. Technical report, Artificial Intelligence and Simulation Research Group, University of Arizona, 1997.

[22] 85 Ernesto Kofman. *Discrete Event Based Simulation and Control of Continuous Systems.* PhD thesis, Universidad Nacional de Rosario, 2003.

[23] 86 Jean Rouat, Ramin Pichevar, and Stephane Loiselle. *Nonlinear Speech Modeling and Applications,* chapter Perceptive, Non linear Speech Processing and Spiking Neural Networks, pages 317-337. Springer, 2005.

[24] 87 J. J. Hopfield and A. V. Herz. Rapid local synchronization of action potentials: toward computation with coupled integrate-and-fire neurons. *Proc Natl Acad Sci USA,* 92(15):6655-6662, 1995.

What is claimed is:

1. A method for characterizing a pattern, the method comprising:

providing a spiking neural network having at least one layer of neurons;

connecting each neuron to at least one other neuron for transmitting signals from said neuron to said at least one other neuron;

specifying a time interval, wherein an active neuron is a neuron that spikes at least once during the time interval;

computing, for each neuron, time-varying synaptic weights between said neuron and said at least one other neuron connected to said neuron, the time-varying synaptic weights being computed according to a number of neurons that are connected to said neuron and that are active during the time interval, the time-varying synaptic weights being further computed according to an activity of the spiking neural network during the time interval;

synchronizing spiking of each neuron according to a number of active neurons connected to said neuron and according to the time-varying synaptic weights between said neuron and said at least one other neuron connected to said neuron;

submitting at least one pattern to the spiking neural network for generating sequences of spikes in the spiking neural network, the sequences of spikes being modulated over time by the synchronization of the spiking; and characterizing the at least one pattern according to the sequences of spikes generated in the spiking neural network.

2. A method for characterizing a pattern as recited in claim 1, wherein a time-varying synaptic weight $w_{\alpha,\beta}(t)$ during a time interval t between a neuron $\alpha$ connected to a neuron $\beta$ is computed by:

$$w_{\alpha,\beta}(t) = \frac{1}{\text{Card}\{N(\alpha)\}} \frac{v(t)}{\Omega(p(\alpha;t), p(\beta;t))},$$

wherein:

$w_{\alpha,\beta}(t)$=synaptic weight between neuron $\alpha$ and neuron $\beta$ during the time interval t;

$p(\alpha;t)$=external input to neuron $\alpha$ during the time interval t;

$p(\beta;t)$=external input to neuron $\beta$ during the time interval t;

$N(\alpha)$=set of active neurons connected to neuron $\alpha$ during the time interval t;

Card$\{N(\alpha)\}$=number of elements in the set $N(\alpha)$;

$v(t)$=function characterizing a level of activity of the spiking neural network during the time interval t: and $\Omega(p(\alpha;t),p(\beta;t))$=any linear or nonlinear function of $p(\alpha;t)$ and $p(\beta;t)$.

3. A method for characterizing a pattern as recited in claim 1, wherein the spiking neural network has a plurality of layers, the method further comprising:

for a pair of layers formed by a first layer and a second layer, allowing connecting respectively at least one first neuron of the first layer to at least one second neuron of the second layer for allowing transmitting signals between the first neuron of the first layer and the second neuron of the second layer.

4. A method for characterizing a pattern as recited in claim 3, the method comprising:
forbidding transmitting signals between all neurons of the first layer and all neurons of the second layer during a segmentation mode; and
allowing transmitting signals between neurons of the first layer and neurons of the second layer during a matching mode.

5. A method for characterizing a pattern as recited in claim 1, wherein the spiking neural network has a plurality of layers, the method further comprising:
for a pair of layers formed by a first layer and a second layer,
disconnecting respectively all neurons of the first layer from all neurons of the second layer for forbidding transmitting signals between all neurons of the first layer and all neurons of the second neuron layer.

6. A method for characterizing a pattern as recited in claim 5, wherein:
disconnecting all neurons of the first layer from all neurons of the second layer occurs at an element selected from the group consisting of a segmenting mode, a boundary extraction mode, a filtering mode and combinations thereof.

7. A method for characterizing a pattern as recited in claim 3, the method comprising:
for each neuron, memorizing times of occurrences of the spikes;
defining a stabilization coefficient using the times of occurrences of the spikes;
characterizing the at least one pattern according to the sequences of spikes generated in the spiking neural network according to an element selected from the group consisting of a value of the stabilization coefficient, a variation of values of the stabilization coefficient, a period of time to reach a value of the stabilization coefficient, a period of time to reach a variation of values of the stabilization coefficient and combinations thereof.

8. A method for characterizing a pattern as recited in claim 7, wherein the stabilization coefficient is defined according to distributions of the sequences of spikes.

9. A method for characterizing a pattern as recited in claim 8, wherein distributions of the sequences of spikes are histogram vectors.

10. A method for characterizing a pattern as recited in claim 1, wherein the pattern is an element selected from the group consisting of an image signal, a video signal, an audio signal, a speech signal, an electronic signal, an optoelectronic and combinations thereof.

11. A method for characterizing a pattern as recited in claim 1, wherein the spiking neural network is a RN-Spikes.

12. A system for characterizing a pattern, the system comprising:
a spiking neural network having at least one layer of neurons;
connections between each neuron and at least one other neuron for transmitting signals between said neuron and said at least one other neuron;
a determiner of a time interval, wherein an active neuron is a neuron that spikes at least once during the time interval;
a computer of, for each neuron, time-varying synaptic weights between said neuron and said at least one other neuron connected to said neuron, the time-varying synaptic weights being computed according to a number of neurons that are connected to said neuron and that are active during the time interval, the time-varying synaptic weights being further computed according to an active of network during the time interval;
a synchronizer of spiking of each neuron according to a number of active neurons connected to said neuron and according to the time-varying synaptic weights between said neuron and said at least one other neuron connected to said neuron;
a supplier of at least one pattern to the spiking neural network for generating sequences of spikes in the spiking neural network, the sequences of spikes being modulated over time by the synchronization of the spiking; and
a characterizer of the at least one pattern according to the sequences of spikes generated in the spiking neural network.

13. A system for characterizing a pattern as recited in claim 12, wherein a time-varying synaptic weight $w_{\alpha,\beta}(t)$ during a time interval t between a neuron $\alpha$ connected to a neuron $\beta$ is computed by:

$$w_{\alpha,\beta}(t) = \frac{1}{\text{Card}\{N(\alpha)\}} \frac{v(t)}{\Omega(p(\alpha;t), p(\beta;t))},$$

wherein:
$w_{\alpha,\beta}(t)$=synaptic weight between neuron $\alpha$ and neuron $\beta$ during the time interval t;
$p(\alpha;t)$=external input to neuron $\alpha$ during the time interval t;
$p(\beta;t)$=external input to neuron $\beta$ during the time interval t;
$N(\alpha)$=set of active neurons connected to neuron $\alpha$ during the time interval t;
Card$\{N(\alpha)\}$=number of elements in the set $N(\alpha)$;
$v(t)$=function characterizing a level of activity of the spiking neural network during the time interval t; and
$\Omega(p(\alpha;t),p(\beta;t))$=any linear or nonlinear function of $p(\alpha;t)$ and $p(\beta;t)$.

14. A system for characterizing a pattern as recited in claim 12, wherein the spiking neural network has a plurality of layers, the system further comprising:
for a pair of layers formed by a first layer and a second layer, a connection between respectively at least one first neuron of the first layer and at least one second neuron of the second layer for allowing transmitting signals between the first neuron of the first layer and the second neuron of the second layer.

15. A system for characterizing a pattern as recited in claim 14, the system comprising:
a memory unit for memorizing, for each neuron, times of occurrences of the spikes; and
means for defining a stabilization coefficient using the times of occurrences of the spikes;
wherein the at least one pattern is characterized according to an element selected from the group consisting of a value of the stabilization coefficient, a variation of values of the stabilization coefficient, a period of time to reach a value of the stabilization coefficient, a period of time to reach a variation of values of the stabilization coefficient and combinations thereof.

16. A system for characterizing a pattern as recited in claim 12, wherein the pattern is an element selected from the group consisting of an image signal, a video signal, an audio signal, a speech signal, an electronic signal, an opto-electronic signal and combinations thereof.

17. A system for characterizing a pattern as recited in claim 12, wherein the spiking neural network is a RN-Spikes.

18. A method for characterizing a pattern as recited in claim 1, wherein the time interval is specified according to an oscillatory period of the neurons.

19. A method for characterizing a pattern as recited in claim 1, wherein said neuron and said at least one other neuron are on the same layer.

20. A method for characterizing a pattern as recited in claim 1, wherein submitting at the least one pattern to the spiking neural network comprises extracting constituents of the pattern using a sparse non-negative matrix factorization.

21. A method for characterizing a pattern as recited in claim 1, comprising:
connecting each neuron to a global regulating unit for transmitting signals between said neuron and the global regulating unit;
wherein the sequences of spikes are regulated by the global regulating unit.

22. A system for characterizing a pattern as recited in claim 12, comprising a global regulating unit connected to each neuron for transmitting signals between said each neuron and the global regulating unit and for regulating the sequences of spikes.

* * * * *